(12) United States Patent
Onodera et al.

(10) Patent No.: US 9,045,045 B2
(45) Date of Patent: Jun. 2, 2015

(54) WORK VEHICLE

(71) Applicant: Komatsu Ltd., Tokyo (JP)

(72) Inventors: Yoshitaka Onodera, Hiratsuka (JP);
Yuji Kikuyama, Hiratsuka (JP);
Yoshiaki Nagashima, Oyama (JP);
Hiroyuki Kijima, Yuki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/232,742

(22) PCT Filed: Feb. 28, 2013

(86) PCT No.: PCT/JP2013/055556
§ 371 (c)(1),
(2) Date: Jan. 14, 2014

(87) PCT Pub. No.: WO2014/132416
PCT Pub. Date: Sep. 4, 2014

(65) Prior Publication Data
US 2015/0039164 A1    Feb. 5, 2015

(51) Int. Cl.
*B60L 9/00* (2006.01)
*B60L 15/10* (2006.01)
(Continued)

(52) U.S. Cl.
CPC .............. *B60L 15/10* (2013.01); *B66F 9/07572* (2013.01); *B60L 15/2072* (2013.01)

(58) Field of Classification Search
CPC .............. B60L 15/20; B60L 2240/421; B60L 2240/423; B60L 11/1877; B60L 2240/12; B60L 11/007; B60L 11/02; B60L 2200/40; B60L 2240/441; B60L 2240/443; B60L 2240/461; B60L 2240/486; B60L 2240/507

USPC ........... 701/22, 41, 110; 477/1; 180/220, 331, 180/65.21, 6.48
See application file for complete search history.

(56) References Cited

U.S. PATENT DOCUMENTS

2012/0232735 A1*   9/2012   Hashizaka et al. .............. 701/22
2012/0239236 A1*   9/2012   Eom ............................... 701/22
(Continued)

FOREIGN PATENT DOCUMENTS

JP    2001-352612 A    12/2001
JP    2003-199214 A     7/2003
(Continued)

OTHER PUBLICATIONS

International Search Report dated May 21, 2013, issued for PCT/JP2013/055556.

*Primary Examiner* — Redhwan K Mawari
(74) *Attorney, Agent, or Firm* — Locke Lord LLP

(57) ABSTRACT

A work vehicle is provided with a traveling motor, and includes a first control unit generating a speed command value for controlling the motor and changing the speed command value according to passage of time when an opening of an accelerator that adjusts a traveling speed is larger than 0, and assigning an actual traveling speed of the work vehicle to a relationship between a torque command value that is a command value of torque to be generated by the motor and the traveling speed of the work vehicle to generate a first torque command value; and a second control unit generating a second torque command value based on the speed command value generated by the first control unit and the actual traveling speed, and controlling the motor based on the first torque command value or the second torque command value.

6 Claims, 30 Drawing Sheets

(51) Int. Cl.
  *B66F 9/075* (2006.01)
  *B60L 15/20* (2006.01)

(56) References Cited

U.S. PATENT DOCUMENTS

2013/0124024 A1* 5/2013 Nakamura et al. .............. 701/22
2013/0226385 A1* 8/2013 Ueno et al. ...................... 701/22
2013/0325229 A1* 12/2013 Chen et al. ...................... 701/22
2015/0005988 A1* 1/2015 Cox .................................. 701/3
2015/0039164 A1* 2/2015 Onodera et al. ................. 701/22

FOREIGN PATENT DOCUMENTS

JP  2009-286526 A  12/2009
JP  2010-037079 A  2/2010

* cited by examiner

WORK VEHICLE

FIELD

The present invention relates to a work vehicle that travels by a motor.

BACKGROUND

There is a work vehicle that mounts a traveling motor, and supplies electric power to the motor from a battery to travel. As such a work vehicle, Patent Literature 1 discloses, for example, a traveling control device that is applied to an industrial vehicle such as a forklift and to a vehicle that travels by a battery.

CITATION LIST

Patent Literature

Patent Literature 1: Japanese Laid-open Patent Publication No. 2009-286526

SUMMARY

Technical Problem

While the technology disclosed in Patent Literature 1 applies restriction on a maximum vehicle speed and an acceleration/deceleration speed based on a loading state, there may be a case in which a rapid start of the work vehicle is desirably suppressed regardless of the loading state.

An objective of the present invention is to suppress a rapid start of a work vehicle that travels by a motor.

Solution to Problem

According to the present invention, a work vehicle at least provided with a traveling motor, comprises: a first control unit configured to generate a speed command value for controlling the motor and to change the speed command value according to passage of time when an opening of an accelerator that adjusts a traveling speed is larger than 0, and further to generate a first torque command value by assigning an actual traveling speed of the work vehicle to a relationship between a torque command value that is a command value of torque to be generated by the motor and the traveling speed of the work vehicle; and a second control unit configured to generate a second torque command value based on the speed command value generated by the first control unit and the actual traveling speed, and to control the motor based on either the first torque command value or the second torque command value.

In the present invention, it is preferable that the first control unit is configured to cause an absolute value of the speed command value to be larger according to passage of time when the second control unit controls the motor using the second torque command value.

In the present invention, it is preferable that the first control unit is configured to change a change of the speed command value with respect to passage of time based on the opening of the accelerator.

In the present invention, it is preferable that when the second control unit controls the motor using the first torque command value, the first control unit is configured to cause an absolute value of the speed command value to be smaller when a difference between the speed command value and the actual traveling speed becomes a predetermined threshold or more.

In the present invention, it is preferable that the first control unit is configured to obtains a speed from the first torque command value and the actual traveling speed, and to determine that the second control unit controls the motor based on the first torque command value when the speed is the speed command value or less, and the second control unit controls the motor based on the second torque command value when the speed is larger than the speed command value.

In the present invention, it is preferable that the first control unit and the second control unit are configured to exchange information through communication.

According to the present invention, a work vehicle at least provided with a traveling motor, comprises: a first control unit configured to generate a speed command value for controlling the motor and to causes an absolute value of the speed command value to be larger according to passage of time when an opening of an accelerator that adjusts a traveling speed is larger than 0, and further to assign an actual traveling speed of the work vehicle to a first relationship between a torque command value that is a command value of torque to be generated by the motor and the traveling speed of the work vehicle to generate a first torque command value; and a second control unit configured to exchange information with the first control unit through communication and to assign the actual traveling speed to a second relationship between the torque command value and the traveling speed based on the speed command value generated by the first control unit to generate a second torque command value, and to control the motor based on either the first torque command value or the second torque command value.

Advantageous Effects of Invention

The present invention can suppress a rapid start of a work vehicle that travels by a motor.

BRIEF DESCRIPTION OF DRAWINGS

FIG. 11 is a diagram illustrating a state in which the battery-type forklift is on an upward slope, and an accelerator is being stepped on.

DESCRIPTION OF EMBODIMENTS

Embodiments for implementing the present invention (embodiments) will be described in detail with reference to the drawings.

Figure 1:
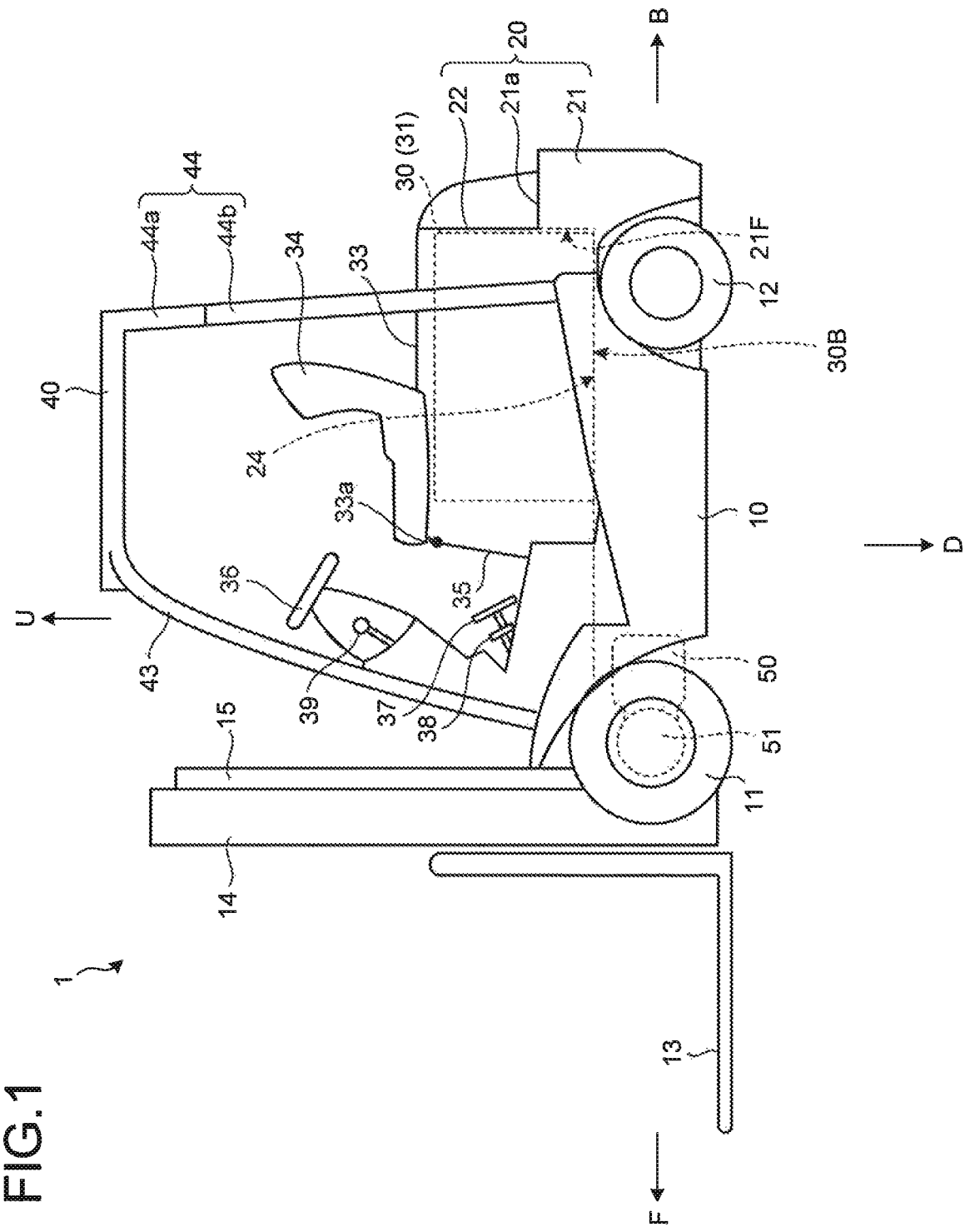
FIG. 1 is a side view illustrating a state of a work vehicle according to the present embodiment when viewed from a left side.
Figure 2:
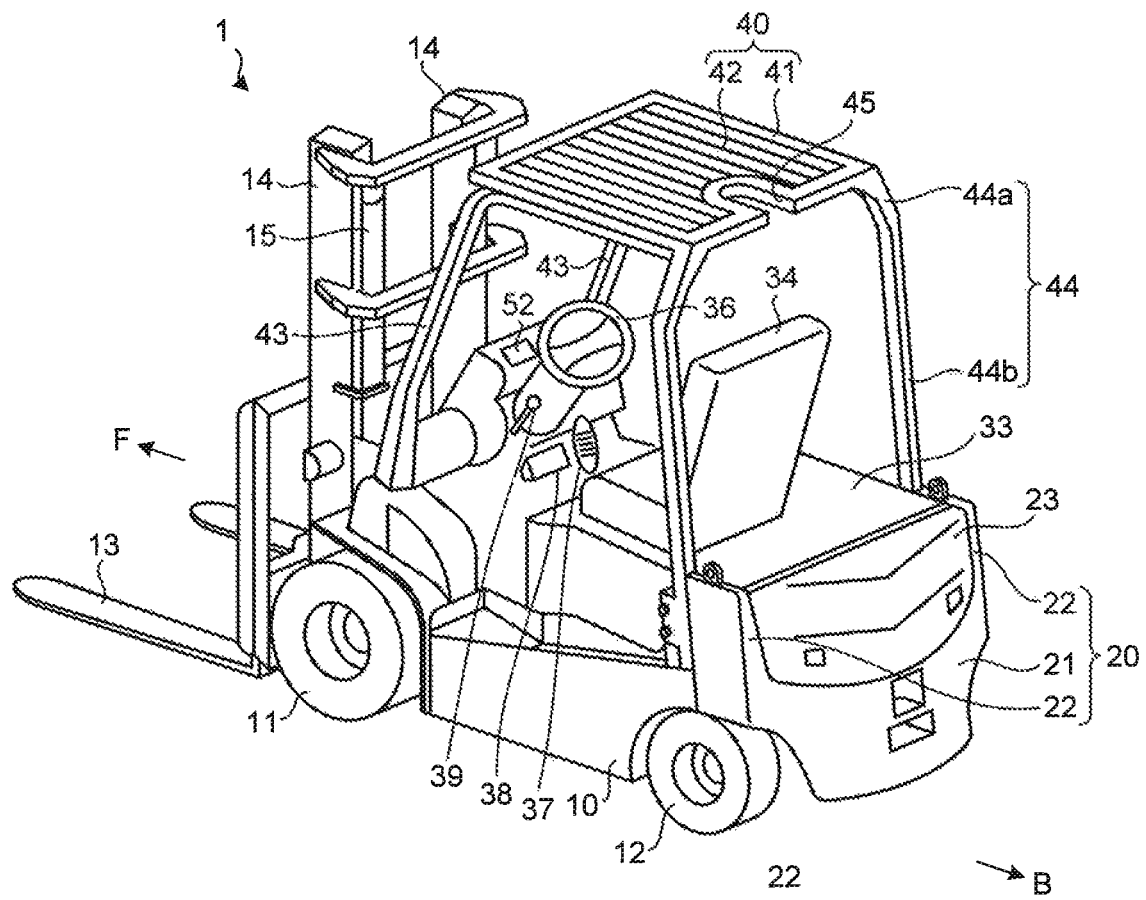
FIG. 2 is a perspective view illustrating a state of the work vehicle according to the present embodiment when viewed from a rear-left oblique-upper side.

FIG. 1 is a side view illustrating a work vehicle according to the present embodiment when viewed from a left side. FIG. 2 is a perspective view illustrating a state of the work vehicle according to the present embodiment when viewed from a rear-left oblique-upper side. In the present embodiment, a battery-type forklift 1 will be described as an example of a work vehicle that travels by a motor. However, the work vehicle is not limited to the example. For example, the work vehicle may be a wheel loader, an excavator, or the like driven by electric power from a battery or by electric power obtained from a generator driven by an engine.

Hereinafter, in the battery-type forklift 1, a side where a fork 13 is provided is a forward F side, and a side where a counter weight 20 is provided is a backward B side. When the work vehicle is not a battery-type forklift, a side from a driver's seat 34 toward a handle 36 as an operation device is a forward F side, and a side from the handle 36 toward the driver's seat 34 is a backward B side. The operation device includes an operation lever used for operating a working machine in an excavator, a wheel loader, or the like, in addition to the handle 36 used for steering the work vehicle.

In the present embodiment, "right and left" means right and left with respect to forward F. A right and left direction is a width direction of a vehicle body 10 as a main body of the work vehicle. An upward U side is a side perpendicular to a plane (ground plane) in contact with at least three of front wheels 11 and rear wheels 12, and from the ground plane toward a rotation center axis of the front wheels 11 and the rear wheels 12. A downward D side is a side from the rotation center axis of the front wheels 11 and the rear wheels 12 toward the ground plane. An axis extending into a forward and backward direction of the vehicle body 10 and passing through a width direction center of the vehicle body 10 is called longitudinal axis, and an axis perpendicular to the longitudinal axis and toward the right and left direction of the vehicle body 10 is called lateral axis. An axis toward an upward and downward direction of the vehicle body 10 is called vertical axis. The vertical axis is perpendicular to both of the longitudinal and lateral axes. Hereinafter, a plane view refers to a state when viewed from upward U.

<Overall Configuration of Battery-Type Forklift 1>

The battery-type forklift 1 includes the front wheels 11 respectively provided at forward corner portions of the vehicle body 10, and the rear wheels 12 respectively provided at backward corner portions of the vehicle body 10. The battery-type forklift 1 travels by the front wheels 11 driven by a traveling motor 50 provided at a backward part of the front wheels 11. To be specific, an output of the traveling motor 50 is transmitted to both of the front wheels 11 and 11 through a power transmission device 51 having a deceleration function, and drives the front wheels 11.

In the present embodiment, as the traveling motor 50, a permanent magnet-type (PM) motor, that is, a motor in which a rotor includes a permanent magnet can be, for example, used. When the PM-type motor is used as the traveling motor 50, a surface permanent magnet-type (SPM) motor or an interior permanent magnet-type (IPM) motor may be employed.

The fork 13 for loading/unloading or moving a load is provided at a forward F part of the vehicle body 10. The fork 13 is supported by a mast 14 provided along the upward and downward direction. The fork 13 moves upward and downward along the mast 14 by driving of a mast cylinder 15 provided between the fork 13 and the mast 14. Although not illustrated in the drawing, a lower end portion of the mast 14 is rotatably attached to the vehicle body 10 around the lateral axis. Further, the mast 14 includes a tilt cylinder (not illustrated) between the mast 14 and the vehicle body 10. The mast 14 can take a forward-bent posture or a backward-bent posture with respect to the vehicle body 10 by driving of a tilt cylinder.

The counter weight 20 is provided at a back end portion of the vehicle body 10. As described above, the battery-type forklift 1 is a counter balance-type forklift, but is not limited thereto. The counter weight 20 is a weight for balancing the vehicle when the fork 13 supports a load. As the counter weight 20, metal is used, for example, but is not limited thereto. The counter weight 20 is arranged from a portion above the rear wheels 12 to a portion at a back end in the vehicle body 10.

As illustrated in FIG. 2, the counter weight 20 is formed to include a recess portion in an upper surface, which is open in the forward and backward direction. To be specific, a pair of columnar members 22 is upwardly installed in a protruding manner toward both sides of a weight main body 21 where an upper surface is even, so that the counter weight 20 including the recess portion on the upper surface is formed. The columnar members 22 are protruding portions that include guide surfaces protruding from portions facing each other at the both sides of the weight main body 21 toward the upward U part and the forward F part of the vehicle body 10 and being in parallel to each other along the forward and backward direction of the vehicle body 10, and are integrally formed with the weight main body 21. Note that a back surface of the counter weight 20 is covered with a resin weight cover 23.

As illustrated in FIG. 1, a battery 30 serving as a power source is mounted on a central portion of the vehicle body 10. The battery 30 is an open-type battery that accommodates a plurality of battery cells inside a battery case 31 that forms a rectangular parallelepiped shape having an open upper surface, and the battery cells are opened. The battery 30 is not limited to the open-type battery. The size of the battery case 31 along the width direction of the vehicle body 10 is slightly smaller than the distance between the pair of columnar members 22. With such a structure, the battery case 31 can pass through between the pair of columnar members 22. The battery 30 is mounted, as illustrated in FIG. 1, on a battery placing surface 24 that is set a more forward F part than a front surface 21F of the weight main body 21 and a more downward D part than an upper surface 21a of the weight main body 21, in the vehicle body 10. The position of the battery placing surface 24 is set such that a back end upper portion of the battery 30 lies between the columnar members 22 and overlaps with the counter weight 20 when the battery 30 is mounted.

A battery hood 33 is arranged at an upward U part of the battery 30 mounted on the battery placing surface 24, and the driver's seat 34 is further arranged on an upper surface of the battery hood 33. The battery hood 33 has a sufficient size for covering the upper surface of the battery case 31, and its front end edge portion is supported by a support bracket 35 of the vehicle body 10 via a support axis 33a along the right and left direction of the vehicle body 10. The support bracket 35 that supports the battery hood 33 is vertically arranged at an upward U part from a portion positioned at a front end of the battery placing surface 24. The battery hood 33 can be moved to a horizontal position where the battery hood 33 covers the upward U part of the battery 30 and to a forward-bent position where the battery hood 33 flips up a back end edge to an upward U part to open an upward U part of the battery 30, by revolving around an axis center of the support axis 33a.

When the battery 30 is replaced, the battery hood 33 is moved to the forward-bent position where the upward U part of the battery 30 is opened. Under this state, the battery 30 is hung to an upward U part of the vehicle body 10 and is drawn to a backward B part and taken out from the vehicle body 10. A charged battery 30 is moved from the backward B part of the vehicle body 10 to the upward U part of the battery placing surface 24 in a hung state, and is mounted on the battery placing surface 24.

A top plate 40 is provided at an upper U part of the vehicle body 10, as illustrated in FIG. 1. As illustrated in FIG. 2, the top plate 40 is a plate in which a plurality of bars 42 is arranged in an approximately rectangular frame body 41 having a size that covers an upward U part of the driver's seat 34, and the size along the width direction of the vehicle body 10 is smaller than the vehicle body 10. The top plate 40 is attached to the vehicle body 10 via a pair of front stays 43 and a pair of rear stays 44.

The front stays 43 extend to the downward D part from a front end corner portion of the top plate 40 to incline toward the forward F part, and individual lower end portions are fixed to a front end portion of the vehicle body 10, as illustrated in FIG. 1. The distance between the front stays 43 is roughly the same throughout the entire length. The rear stay 44 includes expanding parts 44a that linearly protrude toward side parts so as to gradually separating from each other from a back end corner portion of the top plate 40 toward the downward D part, and stay body parts 44b that extends roughly downward from lower end portions of the expanding parts 44a and individual lower end portions of which are fixed to a back end portion of the vehicle body 10.

The distance between the stay body parts 44b arranged in parallel to each other in the rear stays 44 is roughly the same as the distance between the columnar members 22, and allows the battery case 31 and the battery hood 33 to pass through. A position where the stay body part 44b and the expanding part 44a intersect with each other is set to a highest possible position so that the battery hood 33 and the rear stay 44 do not interfere with each other when the battery hood 33 positioned at the horizontal position is moved to the forward-bent position, and the battery case 31 and the rear stay 44 do not interfere with each other when the battery 30 is arranged at the battery moving/placing position.

The battery-type forklift 1 includes an accelerator pedal 37, a brake pedal 38, a direction of travel switching lever 39. The accelerator pedal 37 is an operation member for controlling an output and a rotating direction of the traveling motor 50. The brake pedal 38 is an operation member for stopping the battery-type forklift 1. The direction of travel switching lever 39 is an operation member for switching the direction of travel of the battery-type forklift 1 either forward F or backward B.

As illustrated in FIG. 2, the battery-type forklift 1 includes an operation panel 52 at a forward F part of the handle 36. The operation panel 52 includes an input unit for performing various types of setting with respect to the battery-type forklift 1 and a display unit that displays information related to a state of the battery-type forklift 1 and the like. An operator of the battery-type forklift 1 performs various types of setting with respect to the battery-type forklift 1 through the operation panel 52. Examples of the information related to a state of the battery-type forklift 1 to be displayed in the display unit of the operation panel 52 includes a state of the battery 30, a hydraulic pressure of a hydraulic oil supplied to the mast cylinder 15, and the like. The hydraulic oil is supplied from a hydraulic pump driven by a cargo motor 55 described below.

<Control System of Traveling Motor>

Figure 3:
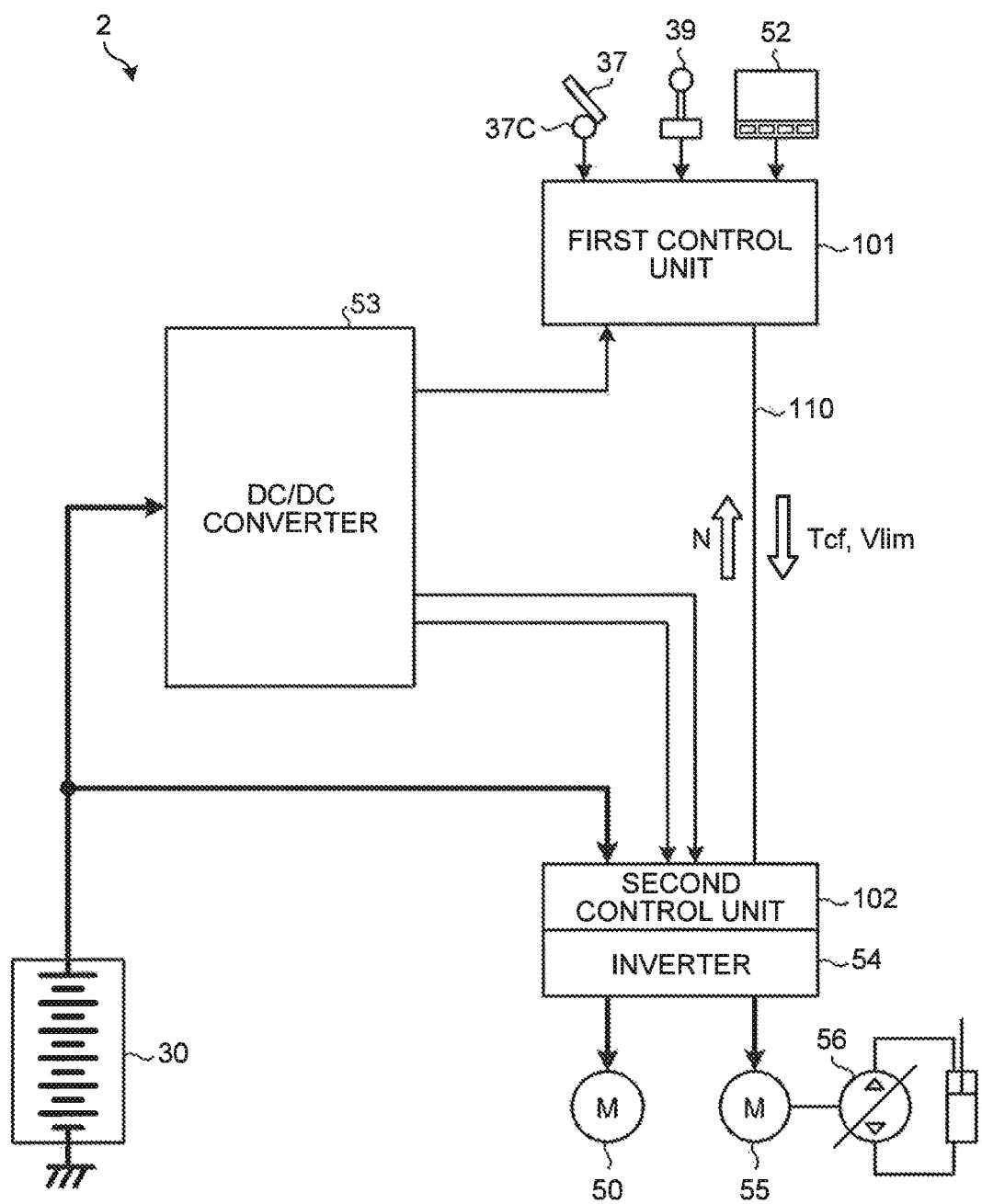
FIG. 3 is a schematic view illustrating a control system of a traveling motor included in a battery-type forklift according to the present embodiment.

FIG. 3 is a schematic view illustrating a control system of the traveling motor included in the battery-type forklift according to the present embodiment. A control system 2 of the traveling motor 50 includes a first control unit 101 and a second control unit 102 included in an inverter 54. The inverter 54 and the second control unit 102 may be separate units. The electric power is supplied to the first control unit 101, the second control unit 102, and the inverter 54 from the battery 30 through a DC/DC converter 53. The DC/DC converter 53 converts a voltage of the battery 30 into voltages respectively necessary for the first control unit 101, the second control unit 102, and the inverter 54, and supplies the voltages to these units.

The first control unit 101 and the second control unit 102 are computers that include a central processing unit (CPU) and a memory. The inverter 54 supplies a driving current to the cargo motor 55 that drives the traveling motor 50 and a hydraulic pump 56 based on a command from the second control unit 102. The first control unit 101 and the second control unit 102 are connected via a communication line 110. The communication line 110 may be an in-vehicle communication line.

The first control unit 101 and the second control unit 102 mutually transmit/receive a signal/information via the communication line 110. The first control unit 101 transmits, to the second control unit 102, a first torque command value Tcf as a command value of torque to be generated by the traveling motor 50, a speed limit Vlim as a speed command value, and the like, for example. The second control unit 102 transmits, to the first control unit 101, an engine speed (engine speed per unit time, hereinafter, may be also referred to as motor engine speed) N of the traveling motor 50 obtained from the traveling motor 50, for example.

An accelerator opening sensor 37C, the direction of travel switching lever 39, and the operation panel 52 are connected to the first control unit 101. The accelerator opening sensor 37C detects opening of the accelerator pedal 37, converts the detected opening into an electrical signal, and outputs the electrical signal. The direction of travel switching lever 39 outputs, for example, a command value according to an advance position, a neutral position, and a reverse position. The operation panel 52 outputs a new changed setting value when the setting of the battery-type forklift 1 is changed, for example.

<First Control Unit 101 and Second Control Unit 102>

Figure 4:
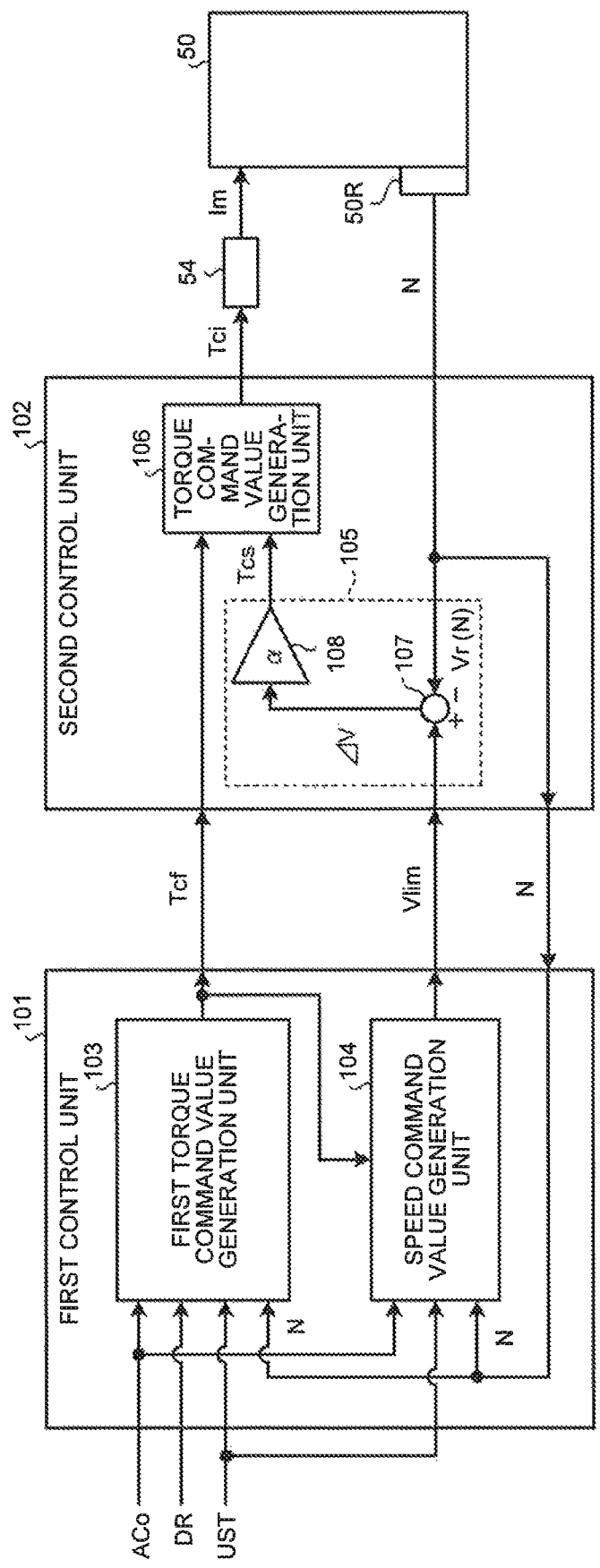
FIG. 4 is a schematic view illustrating a first control unit and a second control unit.

FIG. 4 is a schematic view illustrating the first control unit and the second control unit. The first control unit 101 includes a first torque command value generation unit 103 and a speed command value generation unit 104. The second control unit 102 includes a second torque command value generation unit 105 and a torque command value generation unit 106. The second torque command value generation unit 105 includes a subtraction unit 107 and a multiplication unit 108.

In the present embodiment, an accelerator opening ACo, a direction of travel command value DR, a setting value UST, and a motor engine speed N are input to the first torque command value generation unit 103 of the first control unit 101. The first torque command value generation unit 103 generates a first torque command value Tcf based on these inputs. An accelerator opening ACo, a setting value UST, a motor engine speed N, and a first torque command value Tcf are input to the speed command value generation unit 104. The speed command value generation unit 104 generates a speed limit command Vlim as a speed command value based on these inputs.

The accelerator opening ACo is a signal output by the accelerator opening sensor 37C illustrated in FIG. 3 and is a value corresponding to the opening of the accelerator pedal 37. The direction of travel command value DR is a signal output by the direction of travel switching lever 39 and is a signal that defines the direction of travel of the battery-type forklift 1. The setting value UST is a signal output by the operation panel 52 and corresponding to various setting values of the battery-type forklift 1. The motor engine speed N is a signal output by an engine speed detection sensor 50R attached to the traveling motor 50 and is a value corresponding to the engine speed of the traveling motor 50. As the engine speed detection sensor 50R, a resolver or the like is, for example, used. The motor engine speed N can be converted into an actual speed (actual traveling speed) Vr at which the battery-type forklift 1 travels. That is, the motor engine speed N is converted into a traveling speed using a deceleration ratio of the power transmission device 51 illustrated in FIG. 1 and a radius of the front wheel 11 (to be specific, a radius from a rotation center of the front wheel 11 to the ground surface).

The speed limit command Vlim generated by the speed command value generation unit 104 and the motor engine speed N detected and output by the engine speed detection sensor 50R are input to the subtraction unit 107 included in the second torque command value generation unit 105 of the second control unit 102. The subtraction unit 107 calculates a difference $\Delta V$ between the speed limit command Vlim and the motor engine speed N. At this time, the second control unit 102 converts the motor engine speed N into the actual traveling speed Vr and inputs the actual traveling speed Vr to the subtraction unit 107. The multiplication unit 108 multiplies the difference $\Delta V$ by a coefficient $\alpha$, and outputs $\alpha \times \Delta V$ that is a result of the multiplication to the torque command value generation unit 106 as a second torque command value Tcs.

The first torque command value Tcf generated by the first torque command value generation unit 103 and the second torque command value Tcs generated by the second torque command value generation unit 105 are input to the torque command value generation unit 106. The torque command value generation unit 106 outputs either the input first torque command value Tcf or second torque command value Tcs to the inverter 54 as a command value of torque to be generated by the traveling motor 50 (actual torque command value). The torque command value output by the torque command value generation unit 106 is appropriately referred to as a third torque command value Tci.

The third torque command value Tci generated by the torque command value generation unit 106 of the second control unit 102 is input to the inverter 54. The inverter 54 supplies a current necessary for the traveling motor 50 to generate torque corresponding to the third torque command value Tci to the traveling motor 50 as a driving current Im and drives the traveling motor 50.

<Control of Traveling Motor 50 by First Control Unit 101 and Second Control Unit 102>

Figure 5:
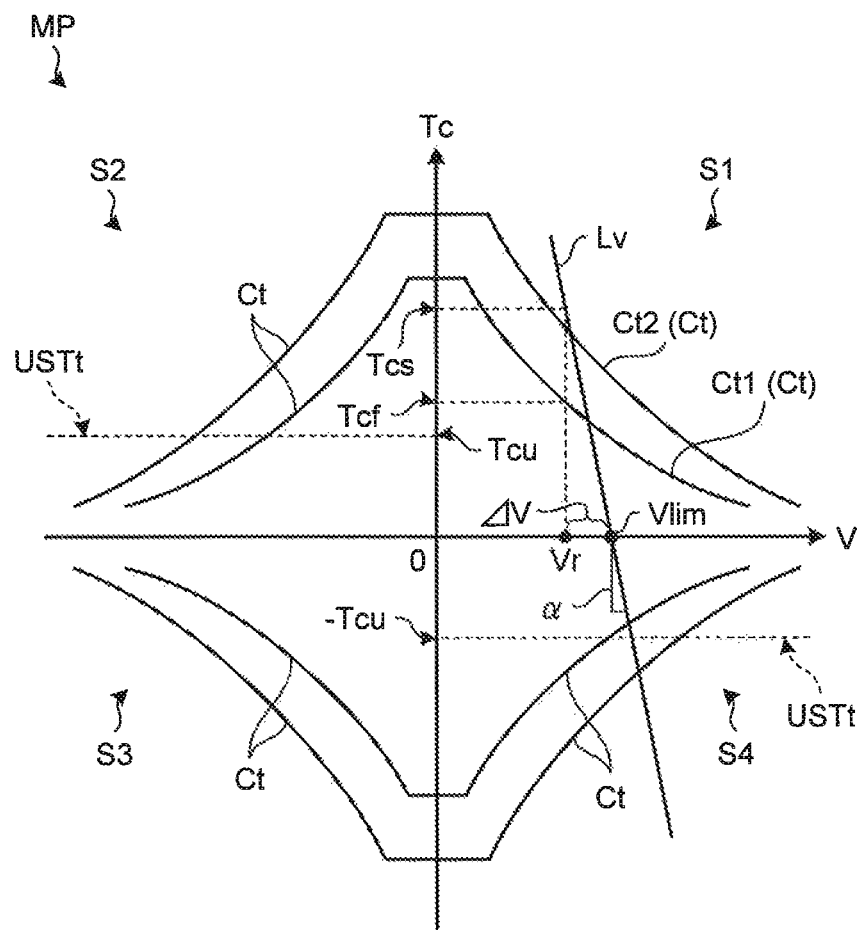
FIG. 5 is a conceptual diagram of an example of a control map used by the first control unit and the second control unit for control of the traveling motor.
Figure 6:
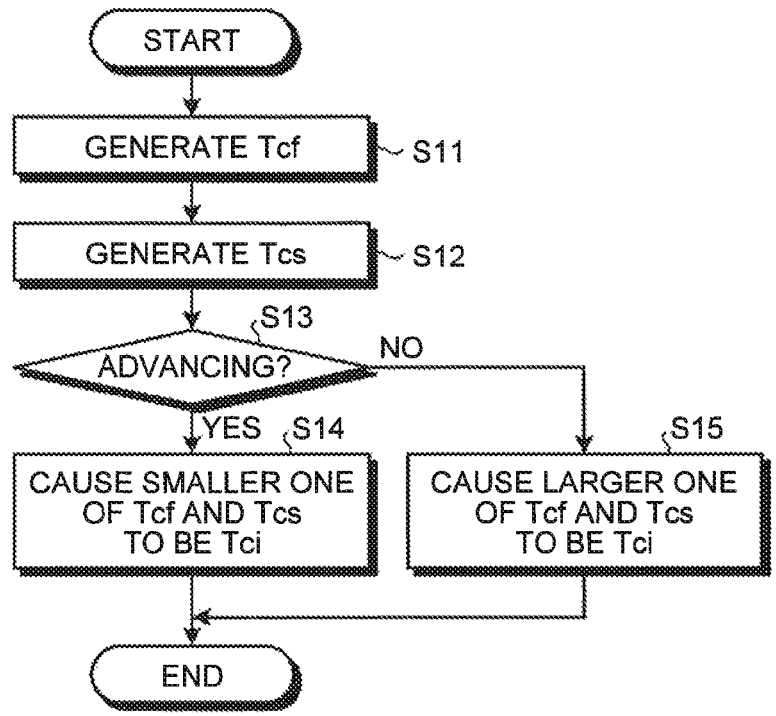
FIG. 6 is a flowchart illustrating an example of a procedure when the first control unit and the second control unit control the traveling motor.

FIG. 5 is a conceptual diagram illustrating an example of a control map used by the first control unit and the second control unit for control of the traveling motor. FIG. 6 is a flowchart illustrating an example of a procedure when the first control unit and the second control unit control the traveling motor. In the present embodiment, the first control unit 101 generates the first torque command value Tcf according to a control map MP (step S11). The second control unit 102 generates the second torque command value Tcs based on the speed limit command Vlim and the actual traveling speed Vr (step S12), and outputs either the first torque command value Tcf or the second torque command value Tcs to the inverter 54 as the third torque command value Tci. The control map MP is described in an orthogonal coordinate system where the torque command value Tc is a vertical axis and the traveling speed V is a horizontal axis. As described above, the first torque command value Tcf is generated by the first control unit 101 and the second torque command value Tcs is generated by the second control unit 102. The control map MP illustrated in FIG. 5 is stored in a storage unit of the first control unit 101, for example.

A relationship between the traveling speed V and the torque command value Tc when the battery-type forklift 1 advances and performs powering is described in a first quadrant S1 of the control map MP. A relationship between the traveling speed V and the torque command value Tc when the battery-type forklift 1 reverses and is regenerated is described in a second quadrant S2. A relationship between the traveling speed V and the torque command value Tc when the battery-type forklift 1 reverses and performs powering is described in a third quadrant S3. A relationship between the traveling speed V and the torque command value Tc when the battery-type forklift 1 advances and is regenerated is described in a fourth quadrant S4.

The first torque command value generation unit 103 of the first control unit 101 illustrated in FIG. 4 assigns the actual traveling speed Vr of the battery-type forklift 1 (hereinafter, appropriately referred to as actual traveling speed) to a relationship between the torque command value Tc that is a command value of the torque to be generated by the traveling motor 50 and the traveling speed V of the battery-type forklift 1 (hereinafter, appropriately referred to as torque command curve) Ct to generate the first torque command value Tcf (step S11). The torque command curve Ct is a relationship between the traveling speed V of the battery-type forklift 1 and the torque command value Tc, and the torque command value Tc is unambiguously determined with respect to the traveling speed V. In the present embodiment, the torque command curve Ct is set, for example, as a traction force curve or a brake force curve of the traveling motor 50. A plurality of the torque command curves Ct is set corresponding to the size of the accelerator opening ACo. For example, in the first quadrant S1 and the third quadrant S3, of the control map MP, that is, at the powering, in the plurality of torque command curves Ct, the accelerator opening ACo is set larger when an absolute value of the torque command value Tc is larger than the same traveling speed V. In the first quadrant S1, the accelerator opening ACo of the torque command curve Ct2 is larger than that of the torque command curve Ct1. The first torque command value Tcf is a value on the vertical axis of the control map MP (torque command value Tc) when the first torque command value generation unit 103 provides the torque command curve Ct according to the accelerator opening ACo (for example, the torque command curve Ct1) with the actual traveling speed Vr. In this way, the torque command curve Ct is changed according to the accelerator opening ACo.

The speed command value generation unit 104 of the first control unit 101 illustrated in FIG. 4 generates the speed limit command Vlim. The speed limit command Vlim is used for controlling the traveling motor 50. The speed limit command Vlim is changed depending on a traveling state of the battery-type forklift 1. Details of the speed limit command Vlim will be described below.

In the present embodiment, the second torque command value generation unit 105 of the second control unit 102 generates the second torque command value Tcs based on the speed limit command Vlim and the actual traveling speed Vr (step S12). To be specific, as described above, the second torque command value generation unit 105 multiplies the difference $\Delta V$ between the speed limit command Vlim and the actual traveling speed Vr by the coefficient $\alpha$ to generate $\alpha \times \Delta V$ that is the second torque command value Tcs. As illustrated in FIG. 5, the coefficient $\alpha$ is an inclination of a straight line (speed limit line) Lv that passes through the speed limit command Vlim. The second torque command value generation unit 105 includes a plurality of coefficients $\alpha$, and may change the coefficient $\alpha$ according to a travel condition, setting, or the like of the battery-type forklift 1. When the coefficient $\alpha$ is constant, the second torque command value Tcs is changed along the speed limit line Lv by changing of the actual traveling speed Vr and the speed limit command Vlim. The speed limit command Vlim and the speed limit line Lv are described on the control map MP of the FIG. 5 for convenience of description. However, since they are related to generation of the second torque command value Tcs, in reality, they are not described on the control map MP.

The torque command value generation unit 106 of the second control unit 102 illustrated in FIG. 4 selects either the first torque command value Tcf or the second torque command value Tcs depending on the traveling state of the battery-type forklift 1, and outputs the selected value as the third torque command value Tci. In the present embodiment, when the battery-type forklift 1 is advancing (Yes in step S13), the torque command value generation unit 106 controls the traveling motor 50 using a smaller one of the first torque command value Tcf and the second torque command value Tcs as the third torque command value Tci (step S14). When the battery-type forklift 1 is reversing (No in step S13), the torque command value generation unit 106 controls the traveling motor 50 using a larger one of the first torque command value Tcf and the second torque command value Tcs as the third torque command value Tci (step S15).

A dotted straight line that passes through a torque command value Tcu or −Tcu on the control map MP and is parallel to the horizontal axis is a switch-back regenerative force (brake force) USTt set by an operator of the battery-type forklift 1. When the switch-back regenerative force (brake force) USTt is set, the switch-back regenerative force (brake force) USTt serves as an upper limit of the first torque command value Tcf. For example, the switch-back regenerative force (brake force) USTt becomes the upper limit of the first torque command value Tcf regardless of the torque command curve Ct. Therefore, when the third torque command value Tci is generated based on the switch-back regenerative force (brake force) USTt, the traveling motor 50 does not output torque that is larger than the torque command value Tcu corresponding to the switch-back regenerative force (brake force) USTt. As a result, the actual traveling speed Vr of the battery-type forklift 1 is limited to the speed when the traveling motor 50 outputs the torque corresponding to the torque command value Tcu.

Figure 7:
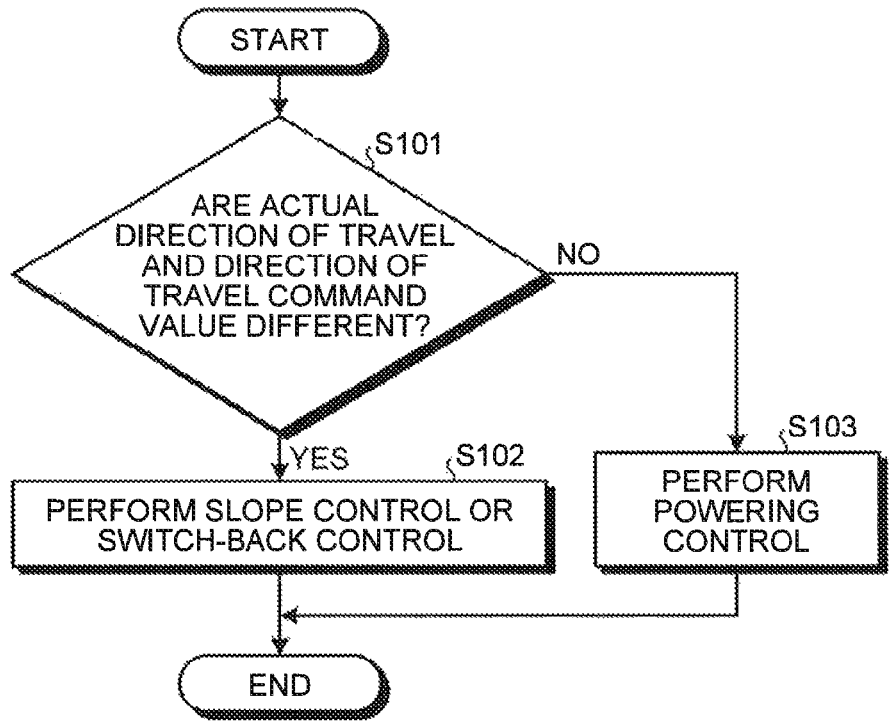
FIG. 7 is a flowchart illustrating an example of control of the traveling motor according to the present embodiment.

FIG. 7 is a flowchart illustrating an example of control of the traveling motor according to the present embodiment. In the present embodiment, the first control unit 101 switches slope control, switch-back control, and powering control according to the traveling state of the battery-type forklift 1 (including a stop) to control the traveling motor 50. For example, the first control unit 101 executes the slope control and the switch-back control by determining the speed limit command Vlim based on the actual direction of travel of the battery-type forklift 1 and the direction of travel command value DR that defines the direction of travel of the battery-type forklift 1. The slope control is control of suppressing a sharp increase in the actual traveling speed Vr when the actual direction of travel of the battery-type forklift 1 and the direction of travel command value DR are different and the actual traveling speed Vr is increased in the opposite direction to the direction of travel command. Mainly, the slope control is executed when the battery-type forklift 1 stops on a slope. The switch-back control is control when the battery-type forklift 1 performs a switch-back operation. The switch-back operation is an operation of the battery-type forklift 1 when the actual direction of travel of the battery-type forklift 1 and the direction of travel defined by the direction of travel command value DR are different. For example, an operation when the direction of travel switching lever 39 is switched to the reverse position in a state where the accelerator pedal 37 illustrated in FIGS. 1 and 2 is stepped on and the battery-type forklift 1 is advanced where the direction of travel switching lever 39 is switched to the advance position is the switch-back operation. The powering operation is control executed when the battery-type forklift 1 is powering, that is, the driving current Im is supplied to the traveling motor 50.

In controlling the operation of the traveling motor 50 by the first control unit 101 and the second control unit 102, when the actual direction of travel of the battery-type forklift 1 and the direction of travel command value DR (the command of the direction of travel switching lever 39) are different in step S101 (Yes in step S101), the first control unit 101 and the second control unit 102 execute the slope control or the switch-back control in step S102. In step S103, when the actual direction of travel of the battery-type forklift 1 and the direction of travel command value DR are the same, the first control unit 101 and the second control unit 102 execute the powering control in step S103. Next, details of each control will be described.

<Slope Control>

Figure 8:
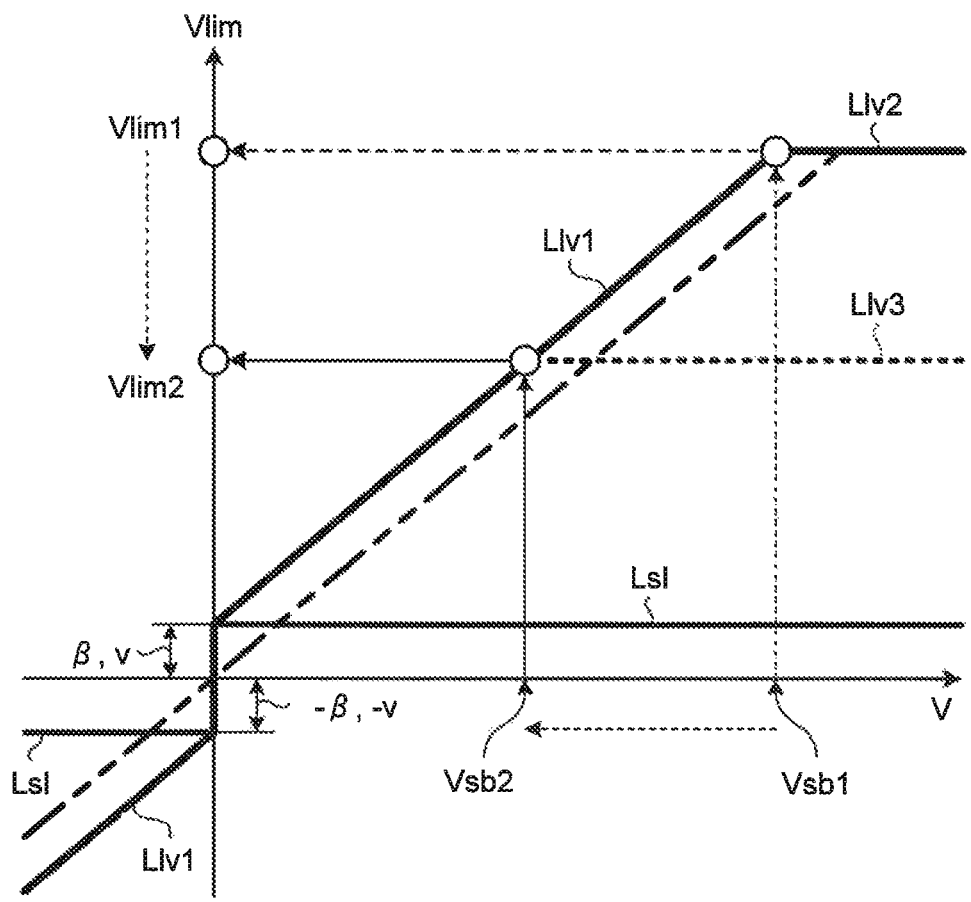
FIG. 8 is a diagram illustrating a relationship between a speed limit command and an actual traveling speed in slope control and in switch-back control.
Figure 9:
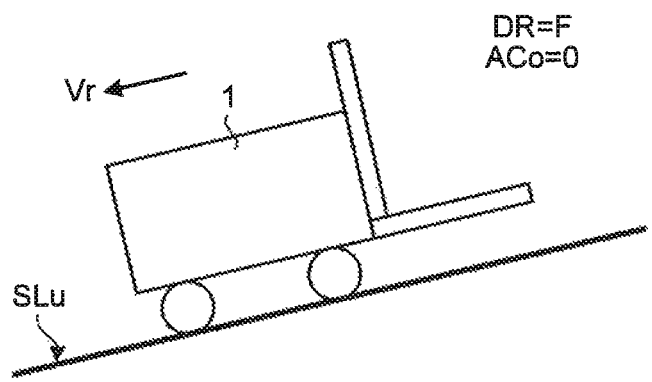
FIG. 9 is a diagram illustrating a state in which the battery-type forklift is on an upward slope.
Figure 10:
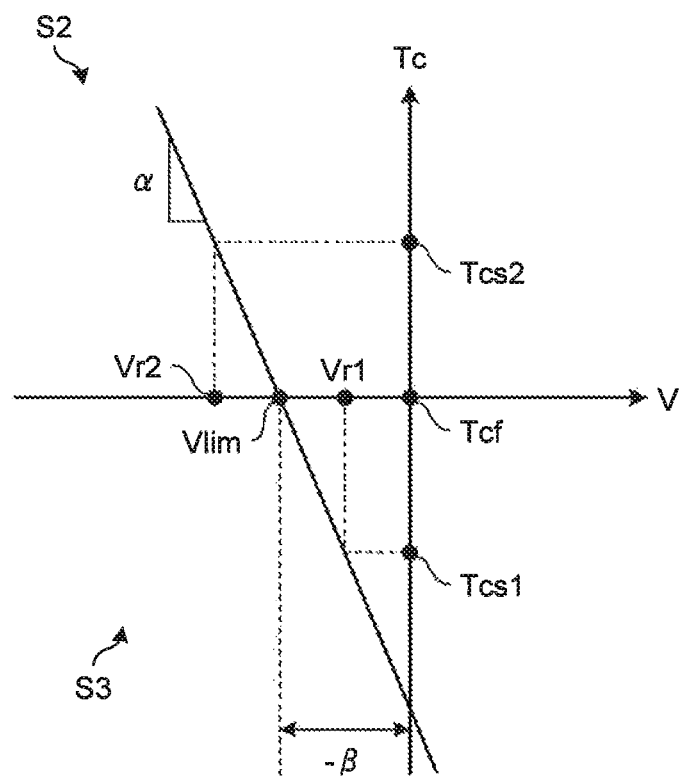
FIG. 10 is a diagram for describing a third torque command value and an operation of the battery-type forklift in slope control.

FIG. 8 is a diagram illustrating a relationship between the speed limit command and the actual traveling speed in the slope control and in the switch-back control. FIG. 9 is a diagram illustrating a state in which the battery-type forklift is on an upward slope. FIG. 10 is a diagram for describing the third torque command value and the operation of the battery-type forklift in the slope control.

In the slope control, as illustrated in FIG. 8, the speed limit command Vlim is a constant value $\beta$ or $-\beta$ regardless of the actual traveling speed Vr (the solid line Lsl in FIG. 8). When the speed limit command Vlim is $-\beta$ is when the battery-type forklift 1 is on an upward slope SLu, as illustrated in FIG. 9.

Figure 13:
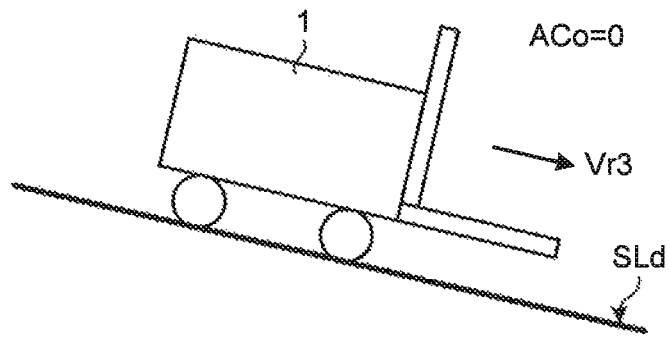
FIG. 13 is a diagram illustrating a state in which the battery-type forklift is on a downward slope.

When the speed limit command Vlim is $\beta$ is when the battery-type forklift 1 is on a downward slope SLd, as illustrated in FIG. 13. $\beta$ may be 0 as long as it is a constant value, in the present embodiment, $\beta$ is about 0.5 km/h, for example.

As illustrated in FIG. 9, when the battery-type forklift 1 is on the upward slope SLu and the actual direction of travel of the battery-type forklift 1 and the direction of travel command value DR are different, the first control unit 101 and the second control unit 102 illustrated in FIG. 4 execute the slope control. The slope control is mainly started by switching of the actual direction of travel of the battery-type forklift 1. In this case, the accelerator opening ACo=0. Therefore, the first torque command value generation unit 103 of the first control unit 101 causes first torque command value Tcf=0 as illustrated in FIG. 10. The speed command value generation unit 104 of the first control unit 101 causes the speed limit command Vlim to be a value other than 0, to be specific, to be $-\beta$, as illustrated in FIG. 8. When the actual traveling speed is Vr1, that is, when the battery-type forklift 1 is reversing on the upward slope SLu at Vr1, the second torque command value generation unit 105 of the second control unit 102 obtains the second torque command value Tcs1. The second torque command value Tcs1 is $\alpha \times \Delta V = \alpha \times (Vlim - Vr1)$, as described above.

In this example, the battery-type forklift 1 is reversing at the actual traveling speed Vr1. Therefore, the torque command value generation unit 106 of the second control unit 102 causes a larger one of the first torque command value Tcf and the second torque command value Tcs1 to be the third torque command value Tci. To be specific, as illustrated in FIG. 10, the third torque command value Tci=Tcf=0. Therefore, the battery-type forklift 1 reverses while gradually increasing in speed.

Assume a case in which the battery-type forklift 1 reverses on the upward slope SLu while increasing in speed in a state where the accelerator opening ACo=0, and the actual traveling speed Vr exceeds the speed limit command Vlim and becomes Vr2. The first control unit 101 and the second control unit 102 generate the third torque command value Tci from the first torque command value Tcf, the speed limit command Vlim, and the actual traveling speed Vr2. In this case, as illustrated in FIG. 10, the third torque command value Tci=Tcs2>0. The third torque command value Tci>0 in the second quadrant S2 corresponding to regeneration of the traveling motor 50. Therefore, the traveling motor 50 regenerates the electric power. The traveling motor 50 generates torque in a direction going up the upward slope SLu by the regeneration of the electric power based on the third torque command value Tci. Therefore, the speed at which the battery-type forklift 1 reverses on the upward slope SLu becomes smaller.

Figure 11:
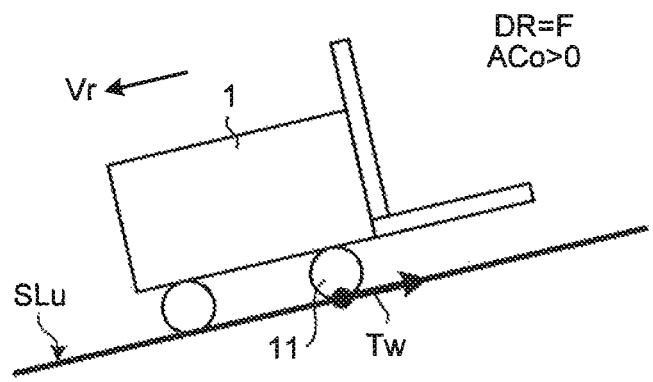
Figure 12:
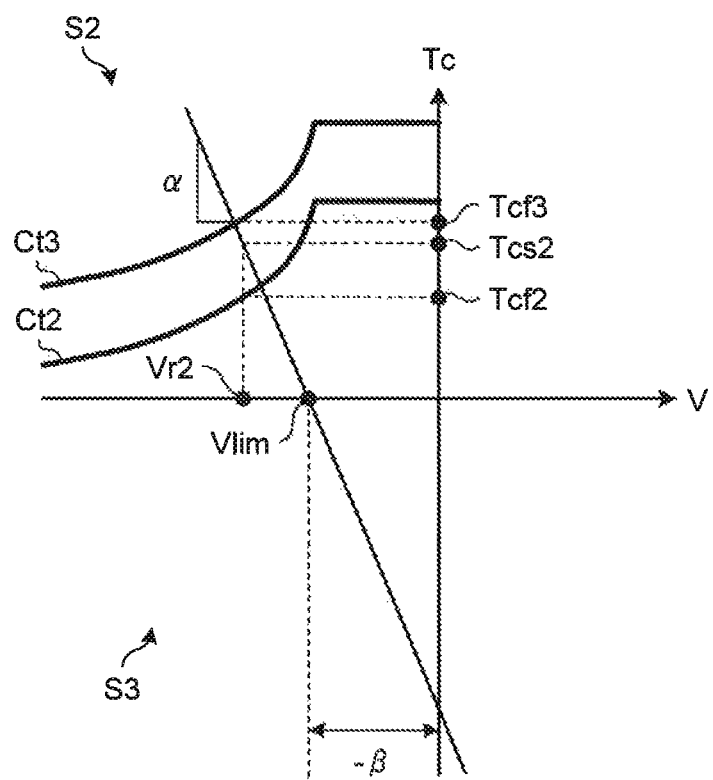
FIG. 12 is a diagram for describing a third torque command value and an operation of the battery-type forklift in a state illustrated in FIG. 11.

FIG. 11 is a diagram illustrating a state in which the accelerator of the battery-type forklift is being stepped on on the upward slope. FIG. 12 is a diagram for describing the third torque command value and the operation of the battery-type forklift in the state illustrated in FIG. 11. As illustrated in FIG. 11, when the accelerator is stepped on in a state where the actual traveling speed is Vr2 and the accelerator opening ACo>0, the front wheel 11 as a driving wheel is generating torque Tw by the traveling motor 50 driven based on the third torque command value Tci. At this time, the first control unit 101 generates the first torque command value Tcf2 from the actual traveling speed Vr2 and the torque command curve Ct2 in the second quadrant S1. The second control unit 102 generates the second torque command value Tcs2 from the speed limit command Vlim and the actual traveling speed Vr2. In this case, as illustrated in FIG. 12, the third torque command value Tci=Tcs2>Tcf2>0.

When the accelerator opening ACo becomes large, the first control unit 101 generates the first torque command value Tcf3 from the actual traveling speed Vr2 and the torque command curve Ct3 of the second quadrant S1. When the actual traveling speed Vr is the same, the torque command curve Ct3 becomes larger than the torque command value Ct2. Therefore, the first torque command value Tcf3 generated from the torque command curve Ct3 becomes larger than the first torque command value Tcf2 generated from the torque command curve Ct2. In the present example, the first torque command value Tcf3 generated from the torque command curve Ct3 becomes larger than the second torque command value Tcs2 generated by the second control unit 102 from the speed limit command Vlim and the actual traveling speed Vr2. In this case, as illustrated in FIG. 12, the third torque command value Tci=Tcf3>Tcs2>0. When the third torque command value Tci overcomes a traveling resistance when the battery-type forklift 1 reverses on the upward slope SLu, the battery-type forklift 1 decelerates. After the deceleration, the control is moved on to the powering control described below by inversion of the direction of the actual traveling speed Vr, and the battery-type forklift 1 goes up the upward slope SLu. Next, a case in which the battery-type forklift 1 is on a downward slope will be described.

Figure 14:
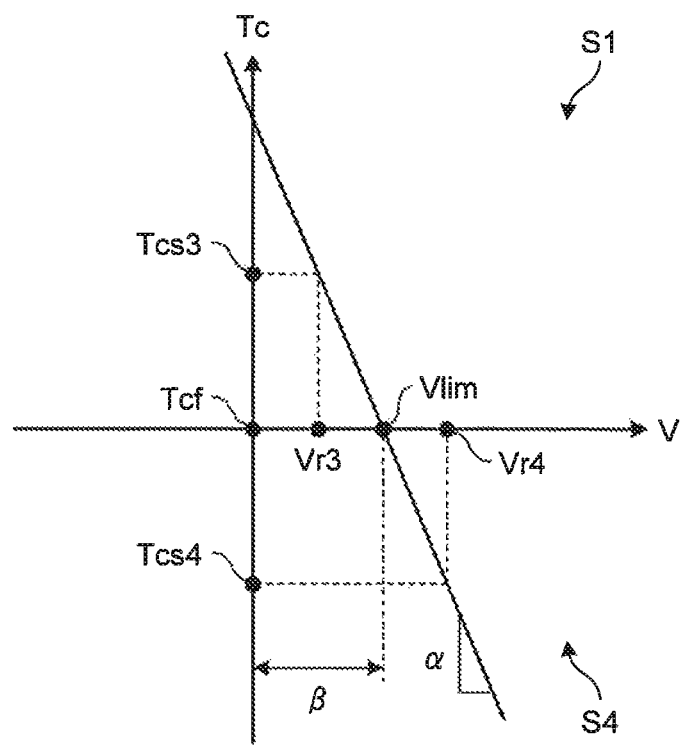
FIG. 14 is a diagram for describing a third torque command value and an operation of the battery-type forklift in slope control.

FIG. 13 is a diagram illustrating a state in which the battery-type forklift is on a downward slope. FIG. 14 is a diagram for describing the third torque command value and an operation of the battery-type forklift in the slope control. As illustrated in FIG. 13, when the battery-type forklift 1 is advancing on a downward slope SLd at an actual traveling speed Vr3, the accelerator opening ACo=0. Therefore, the first torque command value generation unit 103 of the first control unit 101 causes the first torque command value Tcf=0. The speed command value generation unit 104 of the first control unit 101 causes the speed limit command Vlim to be a value other than 0, to be specific, to be β, as illustrated in FIG. 8. As illustrated in FIG. 14, when the actual traveling speed is Vr3, that is, when the battery-type forklift 1 is advancing on the downward slope SLd at the actual traveling speed Vr3, the second torque command value generation unit 105 of the second control unit 102 obtains the second torque command value Tcs3. The second torque command value Tcs3 is, as described above, α×ΔV=α×(Vlim−Vr3).

In this example, the battery-type forklift 1 is advancing at the actual traveling speed Vr3. Therefore, the torque command value generation unit 106 of the second control unit 102 causes a smaller one of the first torque command value Tcf and the second torque command value Tcs3 to be the third torque command value Tci. To be specific, as illustrated in FIG. 14, the third torque command value Tci=Tcf=0. Therefore, the battery-type forklift 1 advances while gradually increasing in speed.

Assume a case in which the battery-type forklift 1 advances the downward slope SLd while increasing in speed in a state where the accelerator opening ACo=0, and the actual traveling speed exceeds the speed limit command Vlim and becomes Vr4. The first control unit 101 and the second control unit 102 generate the third torque command value Tci from the first torque command value Tcf, the speed limit command Vlim, and the actual traveling speed Vr4. In this case, as illustrated in FIG. 14, the third torque command value Tci=Tcs4<0. In the fourth quadrant S4 corresponding to the regeneration of the traveling motor 50, the third torque command value Tci<0. Therefore, the traveling motor 50 regenerates the electric power. The traveling motor 50 generates torque in a direction going up the downward slope SLd by the regeneration based on the third torque command value Tci. Therefore, the speed at which the battery-type forklift 1 advances the downward slope SLd becomes smaller.

In the slope control according to the present embodiment, the first control unit 101 determines the speed limit command Vlim based on the accelerator opening ACo and the actual traveling speed Vr. Then, in the slope control according to the present embodiment, the second control unit 102 controls the traveling motor 50 using a smaller one of the first torque command value Tcf and the second torque command value Tcs when the battery-type forklift 1 advances, and controls the motor using a larger one of the first torque command value Tcf and the second torque command value Tcs when the battery-type forklift 1 reverses. The first control unit 101 executes the slop control by determining the speed limit command Vlim based on the actual direction of travel of the battery-type forklift 1 and the direction of travel command value DR that defines the direction of travel of the battery-type forklift 1. That is, the first control unit 101 determines the speed limit command Vlim to be +β or −β(|β|), in the slope control, on condition that the actual direction of travel of the battery-type forklift 1 and the direction of travel command value DR are different. In doing so, an increase in speed at which the battery-type forklift 1 proceeds in a direction going down the slope can be suppressed.

The slope control according to the present embodiment enables the battery-type forklift 1 to gradually go down a slope by the processing described above. Therefore, the slope control enables the operator of the battery-type forklift 1 to reliably recognize that the battery-type forklift 1 is on a slope. In a case where a PM-type motor is used as the traveling motor 50, when the traveling motor 50 stops with being excited, the permanent magnet attached to the rotor generates heat and may causes a decrease in holding power. The slope control according to the present embodiment gradually moves the battery-type forklift 1 on a slope, and thus can continue the state of rotation when the traveling motor 50 is excited. As a result, the heat generation and the decrease in holding power of the permanent magnet attached to the rotor can be suppressed.

When the actual traveling speed Vr is in the vicinity of 0 where the speed limit command Vlim is 0, the magnitudes of the first torque command value Tcf and the second torque command value Tcs are close to each other, and thus hunting is more likely to occur. Therefore, in the slope control of the present embodiment, when the actual traveling speed Vr is changed from 0, it is favorable to cause the speed limit command Vlim to be a value other than 0, that is, to be a value, an absolute value of which is larger than 0 (in the present embodiment, |β|). This suppresses the hunting when the slope control is being executed. Note that the slope control according to the present embodiment is executed regardless of the accelerator opening ACo when the position of the direction of travel switching lever 39, that is, the direction of travel command value DR and the actual direction of travel of the battery-type forklift 1 are different. Next, the switch-back control will be described.

Figure 15:
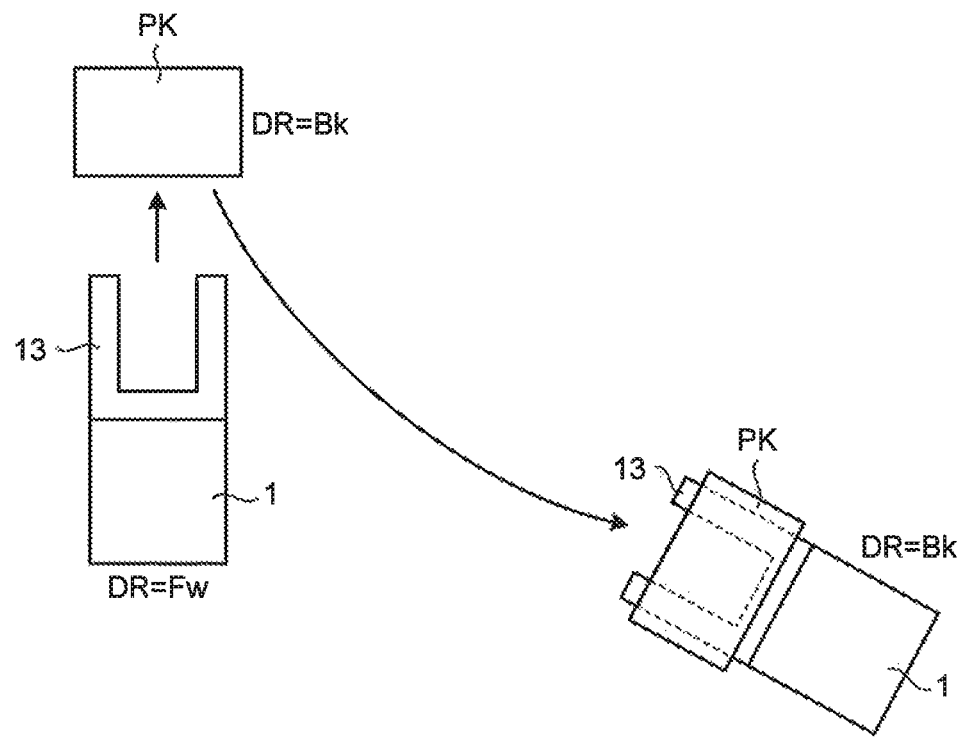
FIG. 15 is a diagram illustrating an example of a switch-back operation.

FIG. 15 is a diagram illustrating an example of the switch-back operation. For example, at a certain timing when the battery-type forklift 1 is advancing toward and approaching a package PK (the direction of travel command value DR=Fw), the operator switches the direction of travel switching lever 39 from the advance position to the reverse position (the direction of travel command value DR=Bk). Then, the fork 13 is inserted under the package PK, and the battery-type forklift 1 starts to reverse at a timing when the package PK is placed on the fork 13. Such an operation is an example of the switch-back operation.

Figure 16:
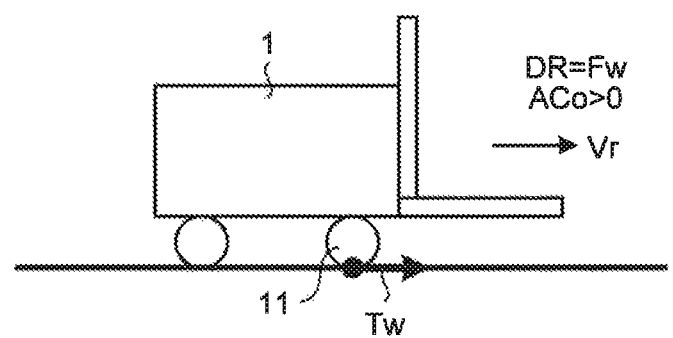
FIG. 16 is a diagram illustrating a state in which the battery-type forklift is powering and advancing.
Figure 17:
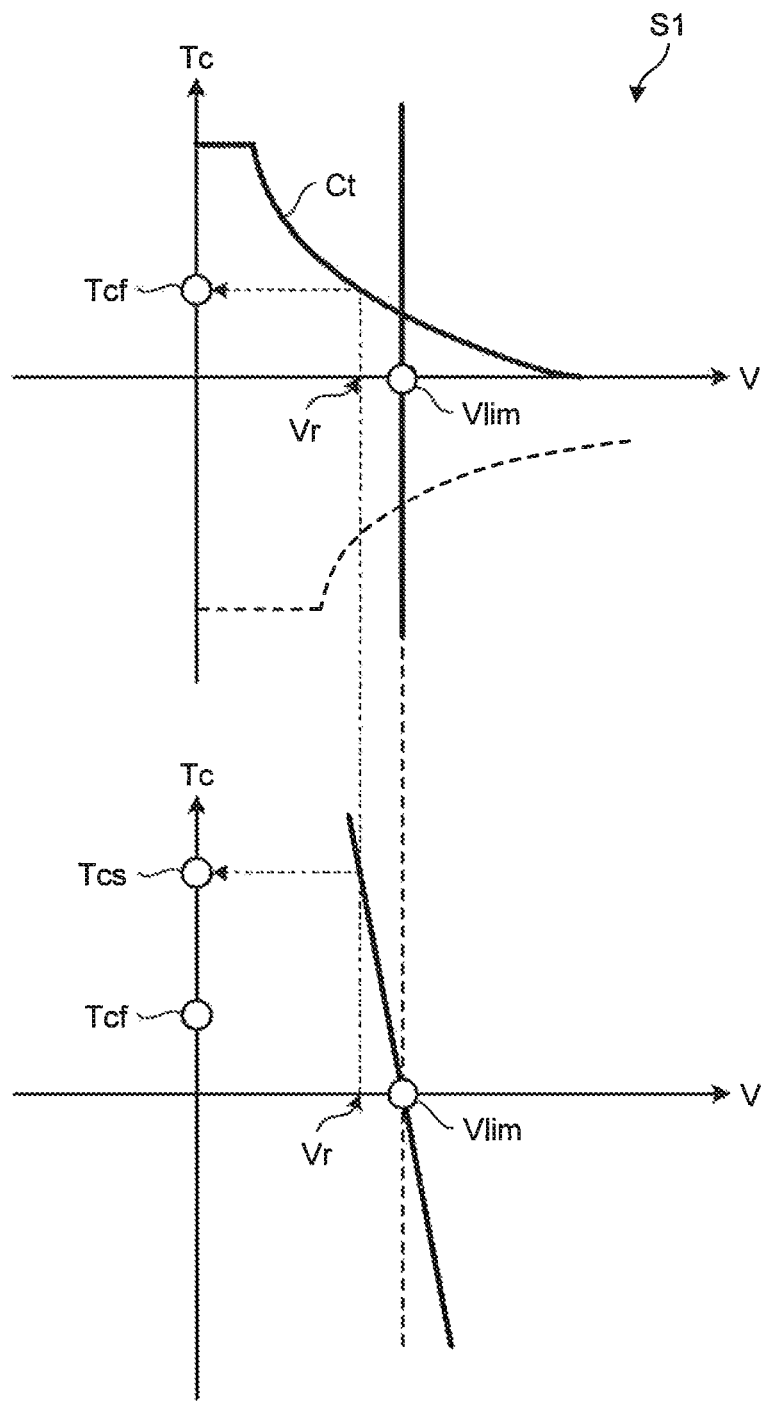
FIG. 17 is a diagram for describing a torque command value in a state in which the battery-type forklift is powering and advancing.

FIG. 16 is a diagram illustrating a state in which the battery-type forklift is powering and advancing. FIG. 17 is a diagram for describing a torque command value when the battery-type forklift is powering and advancing. The battery-type forklift 1 is powering and advancing at the actual traveling speed Vr before entering the switch-back operation, as illustrated in FIG. 16, for example. At this time, the front wheel 11 as a driving wheel is generating torque Tw by the traveling motor 50 driven based on the third torque command value Tci. The accelerator opening ACo is larger than 0, and the direction of travel command value DR is Fw that indicates advance.

Since the battery-type forklift 1 is powering and advancing, the first torque command value Tcf is generated by the first control unit 101 from the torque command curve Ct of the first quadrant S1 and the actual traveling speed Vr. The speed limit command Vlim at this time has been determined by powering control described below. The second torque command value Tcs is generated by the second control unit 102 from the speed limit command Vlim and the actual traveling speed Vr. Since the battery-type forklift 1 is advancing, the second control unit 102 causes a smaller one of the first torque command value Tcf and the second torque command value Tcs, in this example, the first torque command value Tcf to be the third torque command value Tci. The traveling motor 50 is driven by the inverter 54 illustrated in FIG. 4 to generate the first torque command value Tcf. Next, the switch-back control will be described.

Figure 18:
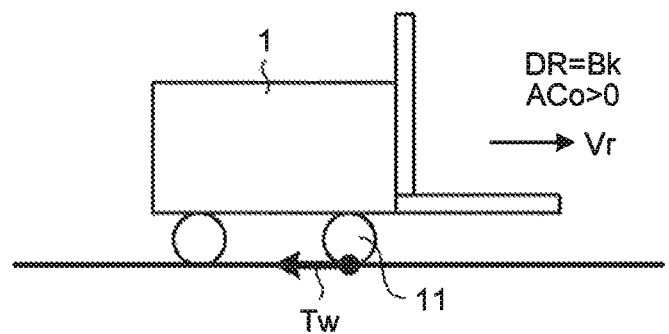
FIG. 18 is a diagram illustrating the battery-type forklift being turned to be in a switch-back operation.
Figure 19:
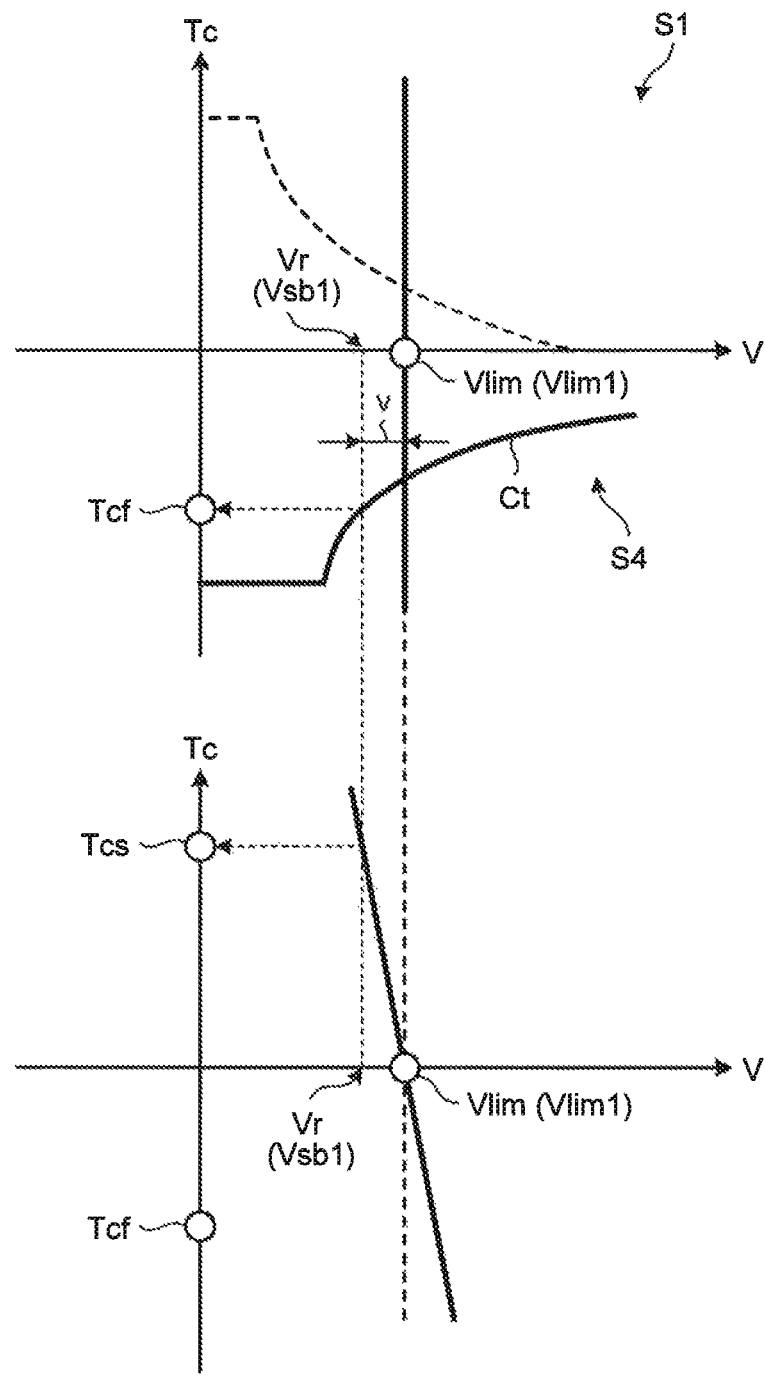
FIG. 19 is a diagram for describing a torque command value when the battery-type forklift is turned to be in the switch-back operation.

FIG. 18 is a diagram illustrating the battery-type forklift being turned to be in the switch-back operation. FIG. 19 is a diagram for describing a torque command value when the battery-type forklift is in the switch-back operation. The switch-back control is executed when the actual direction of travel of the battery-type forklift 1 and the direction of travel command value DR are different, similarly to the slope control. The switch-back control is mainly executed when the direction of travel command value DR is changed. The direction of travel command value DR is changed when the operator of the battery-type forklift 1 operates the direction of travel switching lever 39, for example. The switch-back control is executed by the first control unit 101 and the second control unit 102 illustrated in FIG. 4.

In the battery-type forklift 1 illustrated in FIG. 18, the direction of travel switching lever 39 has been switched from the advance position to the reverse position in a state where the accelerator pedal 37 is stepped on (opened) (ACo>0). Therefore, in the battery-type forklift 1, the actual direction of travel is forward F but the direction of travel command value DR is Bk that indicates reverse. That is, in the battery-type forklift 1, the actual direction of travel and the direction of travel command value DR are different. The front wheel 11 as a driving wheel is generating torque Tw by the traveling motor 50 driven based on the third torque command value Tci. The torque Tw at this time is generated in a direction into which the battery-type forklift 1 is braked and the direction is opposite to a direction to which the battery-type forklift 1 is advanced.

Immediately after the direction of travel switching lever 39 is switched from the advance position to the reverse position, the battery-type forklift 1 is advancing at the actual traveling speed Vr. Since a difference occurs between the actual direction of travel of the battery-type forklift 1 and the direction of travel command value DR (hereinafter, appropriately referred to as a difference in the direction of travel), the first control unit 101 and the second control unit 102 execute the switch-back control. In the switch-back control, the first torque command value generation unit 103 of the first control unit 101 generates the first torque command value Tcf using the torque command curve Ct in the fourth quadrant S4 based on the brake force curve in place of the torque command curve Ct in the first quadrant S1 based on the traction force curve used in the powering control. As is clear from FIG. 19, the first torque command value Tcf is a negative value.

In the switch-back control, the speed limit command Vlim is caused to be larger than the absolute value of the actual traveling speed Vr at the timing when the difference in the direction of travel occurs in the battery-type forklift 1. In the present embodiment, the speed command value generation unit 104 of the first control unit 101 causes a value, which is obtained by adding an arbitrary speed V to the actual traveling speed Vr (Vsb1) at the timing when the difference in the direction of travel occurs in the battery-type forklift 1, to be the speed limit command Vlim (Vlim1), as illustrated in FIGS. 8 and 19. The second control unit 102 generates the second torque command value Tcs from the speed limit command Vlim (Vlim1) and the actual traveling speed Vr (Vsb1). Since the battery-type forklift 1 is advancing, the second control unit 102 causes a smaller one of the first torque command value Tcf and the second torque command value Tcs, in this example, the first torque command value Tcf to be the third torque command value Tci. The traveling motor 50 is driven by the inverter 54 illustrated in FIG. 4 to generate the first torque command value Tcf.

Figure 20:
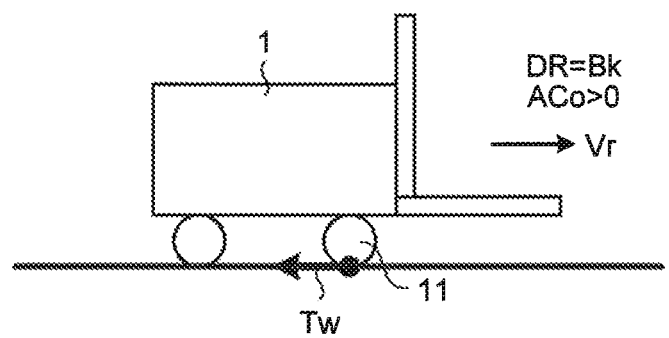
FIG. 20 is a diagram illustrating the battery-type forklift during the switch-back operation.
Figure 21:
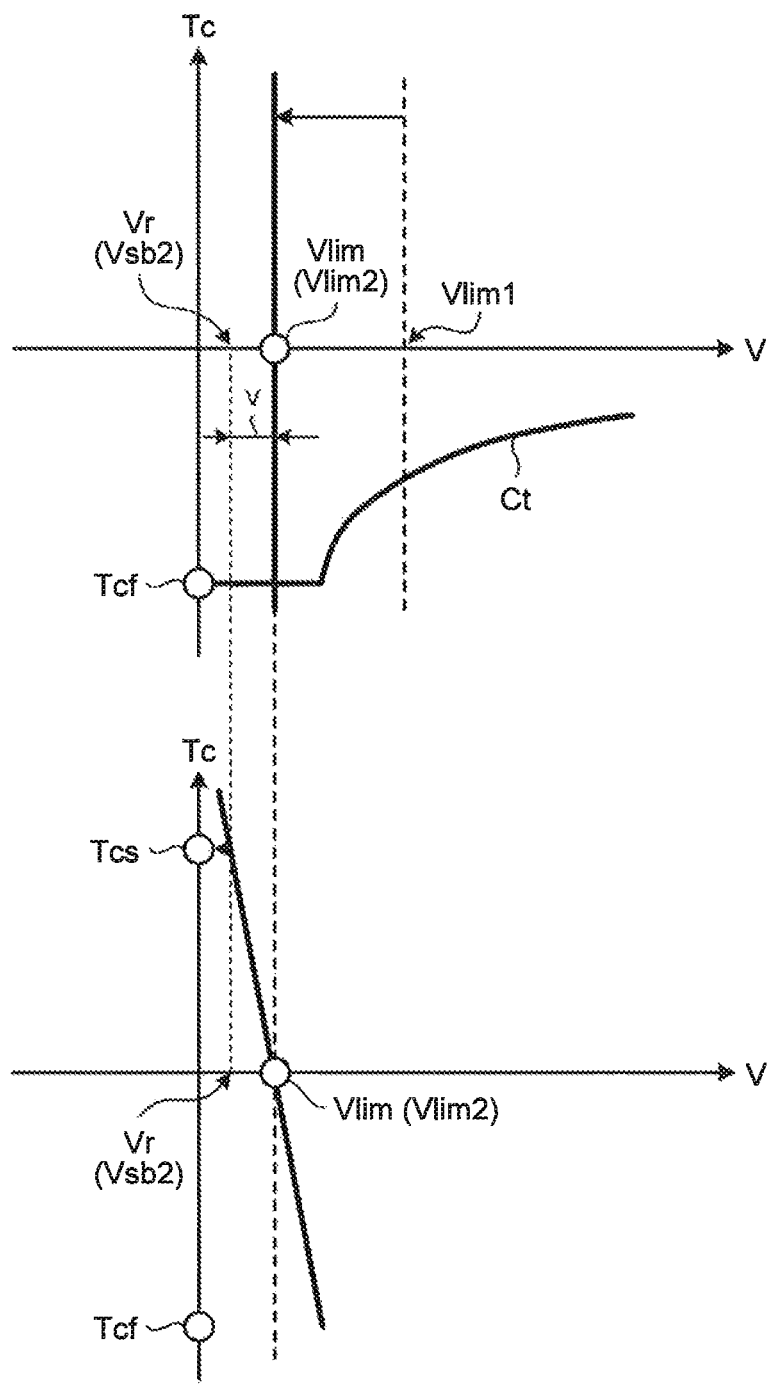
FIG. 21 is a diagram for describing a torque command value during the switch-back operation.

FIG. 20 is a diagram illustrating the battery-type forklift during the switch-back operation. FIG. 21 is a diagram for describing a torque command value during the switch-back operation. The battery-type forklift 1 illustrated in FIG. 20 gradually decelerates by the torque Tw generated by the front wheel 11, that is, by generative braking torque. The generative braking torque is torque causing the battery-type forklift 1 to advance in the opposite direction to the current direction of travel. When the actual traveling speed Vr in the advancing direction is being decreased, the accelerator opening ACo>0, and the direction of travel command value DR is Bk that indicates reverse.

When the battery-type forklift 1 is decelerating in a state where the direction of travel switching lever 39 is switched to the reverse position and the accelerator opening ACo>0, the first torque command value generation unit 103 of the first control unit 101 generates the first torque command value Tcf using the torque command curve Ct in the fourth quadrant S4 based on the brake force curve. In the present embodiment, when the actual traveling speed Vr (Vsb2) is smaller than the actual traveling speed Vr (Vsb1) at the timing when the difference in the direction of travel occurs in the battery-type forklift 1, the speed command value generation unit 104 of the first control unit 101 causes the speed limit command Vlim to be smaller than the speed limit command Vlim1 at the timing when the difference in the direction of travel occurs and to be Vlim2, as illustrated in FIGS. 7 and 21. This means that the speed limit command Vlim is made smaller as the actual traveling speed Vr approaches 0. In this case, the difference between the speed limit command Vlim2 and the actual traveling speed Vsb2 is the speed v as illustrated in FIGS. 7 and 21. That is, in the present embodiment, when the actual traveling speed Vr is decreased, the speed limit command Vlim follows the actual traveling speed Vr with a value larger than the actual traveling speed Vr by the speed v. The speed v may be 0. However, it is favorable to cause the speed v to be a value larger than 0, whereby the generation of hunting can be suppressed in the switch-back control.

As described above, in the present embodiment, the first control unit 101 does not cause the speed limit command Vlim to be larger than the value generated when the difference in the direction of travel occurs in the battery-type forklift 1. That is, the speed limit command Vlim is changed only in the direction to which the speed limit command Vlim is decreased along the solid line Llv1 illustrated in FIG. 8 in the present embodiment. This suppresses reacceleration of the battery-type forklift 1 after the battery-type forklift 1 once decelerates.

The second control unit 102 generates the second torque command value Tcs from the speed limit command Vlim (Vlim2) and the actual traveling speed Vr (Vsb2). Since the battery-type forklift 1 is advancing, the second control unit 102 causes a smaller one of the first torque command value Tcf and the second torque command value Tcs, in this example, the first torque command value Tcf to be the third torque command value Tci. The traveling motor 50 is driven by the inverter 54 illustrated in FIG. 4 to generate the first torque command value Tcf.

Figure 22:
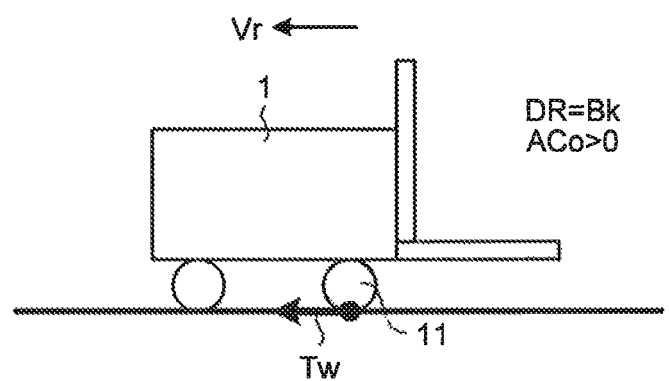
FIG. 22 is a diagram illustrating the battery-type forklift, its direction of travel having been inverted by deceleration.
Figure 23:
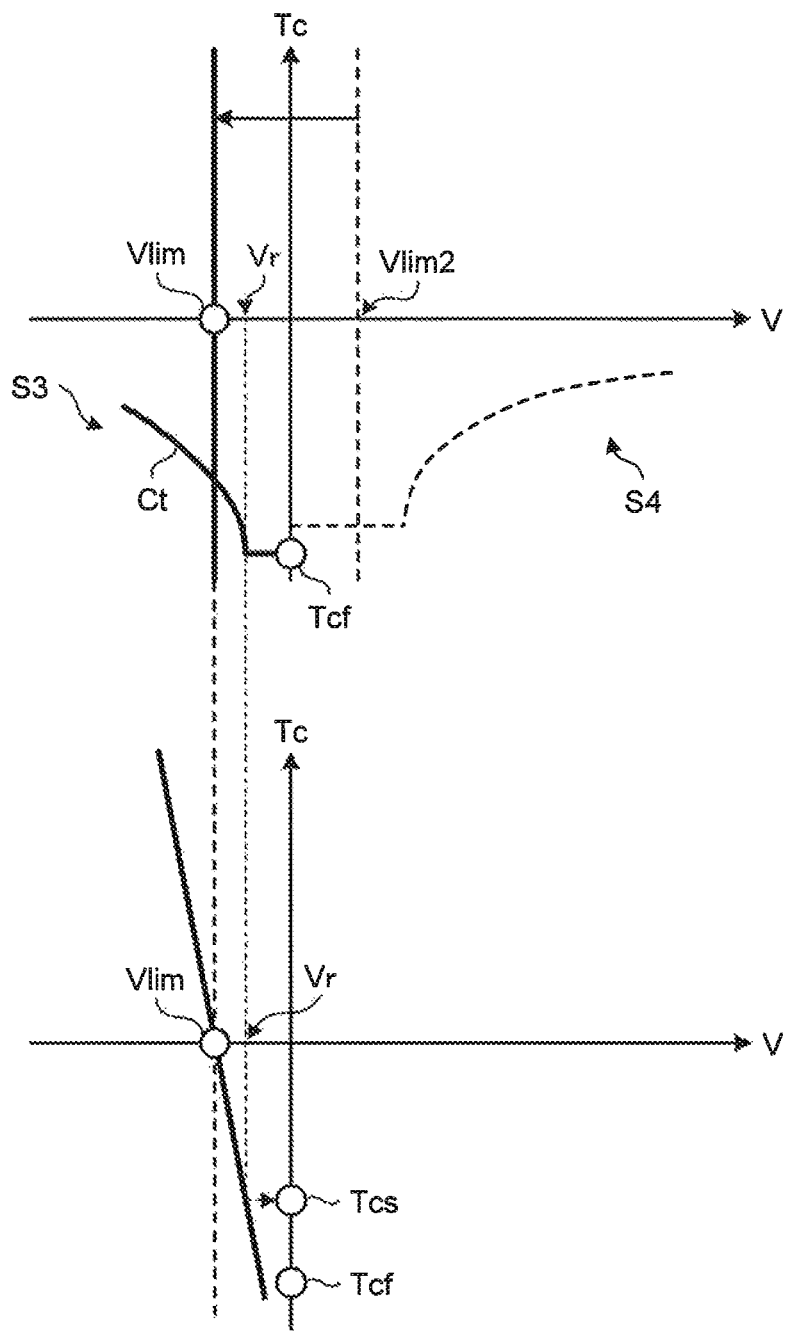
FIG. 23 is a diagram for describing a torque command value when the direction of travel has been inverted by deceleration.

FIG. 22 is a diagram illustrating the battery-type forklift, its direction of travel having been inverted by deceleration. FIG. 23 is a diagram for describing a torque command value when the direction of travel is inverted by deceleration. The battery-type forklift 1 illustrated in FIG. 22 gradually decelerates by the torque Tw generated by the front wheel 11, that is, by the generative braking torque, and the direction of travel has been switched from the advance position to the reverse position. Therefore, the actual direction of travel of the battery-type forklift 1 and the direction of travel command value DR become the same. The accelerator opening ACo>0 and the direction of travel command value DR is Bk that indicates reverse.

When the battery-type forklift 1 is reversing at the actual traveling speed Vr in a state where the direction of travel switching lever 39 is switched to the reverse position and the accelerator opening ACo>0, the first control unit 101 and the second control unit 102 control the traveling motor 50 by reverse powering control. The first torque command value generation unit 103 of the first control unit 101 generates the first torque command value Tcf using the torque command curve Ct in the third quadrant S3 based on the traction force curve in place of the torque command curve Ct in the fourth quadrant S4 based on the brake force curve used in the switch-back control. As is clear from FIG. 23, the first torque command value Tcf is a negative value.

The speed command value generation unit 104 of the first control unit 101 generates the speed limit command Vlim based on the reverse powering control. The second control unit 102 generates the second torque command value Tcs from the speed limit command Vlim and the actual traveling speed Vr. Since the battery-type forklift 1 is reversing, the second control unit 102 causes a larger one of the first torque command value Tcf and the second torque command value Tcs, in the example, the second torque command value Tcs to be the third torque command value Tci. The traveling motor 50 is driven by the inverter 54 illustrated in FIG. 4 to generate the second torque command value Tcs. In the above description, a case in which the accelerator opening ACo>0 has been exemplarily described. However, the switch-back control is executed when the actual direction of travel of the battery-type forklift 1 and the direction of travel command value DR are different regardless of the accelerator opening ACo, similarly to the slope control (hereinafter, the same applies). Next, an example in which the battery-type forklift 1 travels on a downward slope after entering the switch-back control illustrated in FIGS. 24 and 25 will be described.

Figure 24:
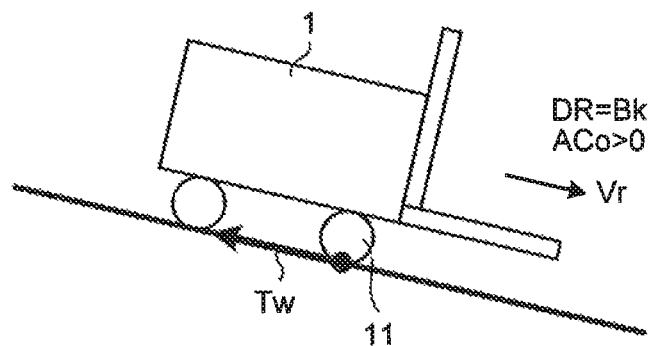
FIG. 24 is a diagram illustrating the battery-type forklift that travels on a downward slope after entering switch-back control.
Figure 25:
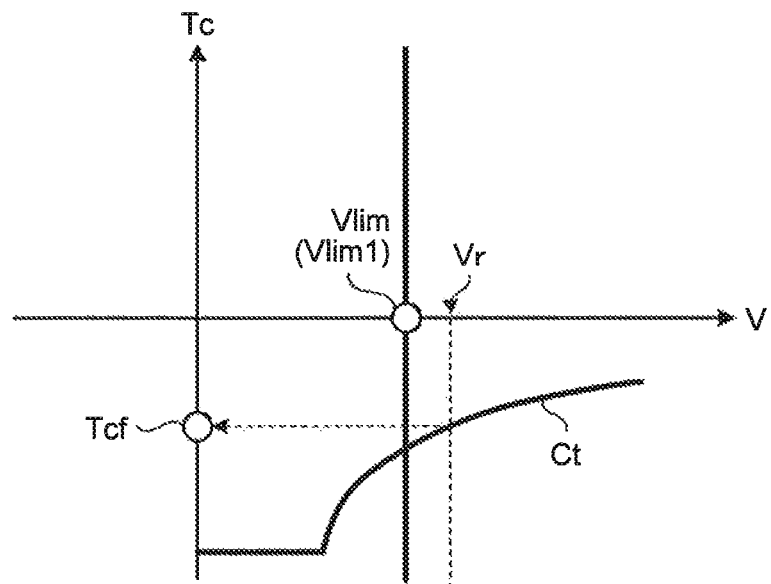
FIG. 25 is a diagram for describing a torque command value when the battery-type forklift travels on a downward slope after entering switch-back control.
Figure 25:
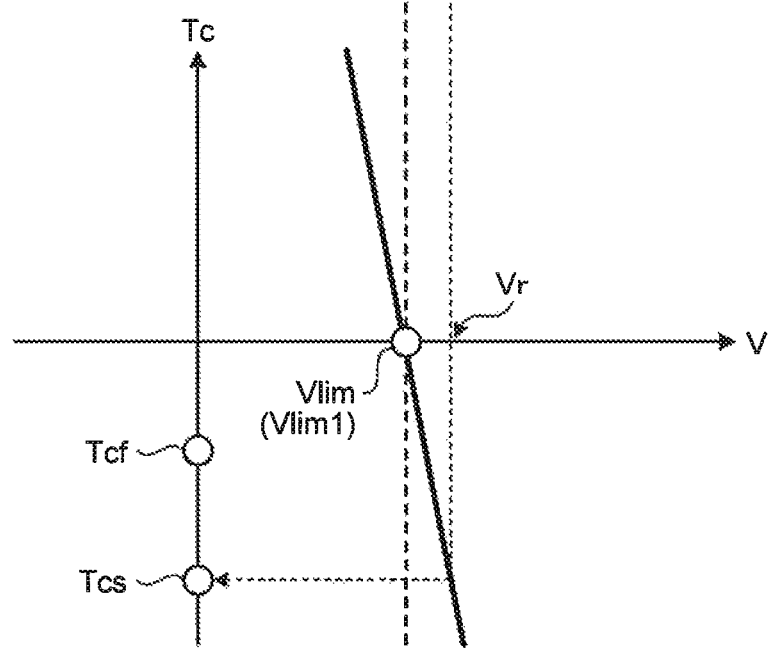

FIG. 24 is a diagram illustrating the battery-type forklift that travels on a downward slope after entering the switch-back control. FIG. 25 is a diagram for describing a torque command value when the battery-type forklift travels on a downward slope after entering the switch-back control. In the battery-type forklift 1 illustrated in FIG. 24, the direction of travel switching lever 39 has been switched from the advance position to the reverse position in a state where the accelerator pedal 37 is stepped on (ACo>0) (DR=Bk). Therefore, the first control unit 101 and the second control unit 102 are executing the switch-back control. Since the battery-type forklift 1 travels on a downward slope, the actual traveling speed Vr is increased.

When the actual traveling speed Vr is increased, as illustrated by the straight line Llv2 illustrated in FIGS. 8 and 25, the speed command value generation unit 104 of the first control unit 101 does not change the speed limit command Vlim. That is, in the present embodiment, the speed command value generation unit 104 does not cause the speed limit command Vlim to be larger than the speed limit command Vlim1 generated at the timing when the difference in the direction of travel occurs in the battery-type forklift 1 and the control is moved on to the switch-back control. In doing so, an increase in actual traveling speed Vr resulting from deficiency of the third torque command value Tci can be suppressed. The third torque command value Tci may become insufficient due to deficiency of the accelerator opening ACo, the slope being steep, the switch-back regenerative force (brake force) USTt illustrated in FIG. 5 being different depending on a user, or the like.

In the switch-back control according to the present embodiment, the first torque command value Tcf is the third torque command value Tci until the actual traveling speed Vr at least exceeds the speed limit command Vlim, and therefore a sudden change of the torque generated by the traveling motor 50 is suppressed. Further, a straight line with an inclination of α, which passes through the speed limit command Vlim intersects with the torque command curve Ct in the fourth quadrant S4. Therefore, the first torque command value Tcf and the second torque command value Tcs are smoothly switched. Therefore, the sudden change of torque generated by the traveling motor 50 is suppressed. Generation of the first torque command value Tcf, the second torque command value Tcs, and the third torque command value Tci is described above, and description is omitted.

As illustrated by the dotted line Llv3 of FIG. 8, when the speed limit command Vlim is changed into a direction of decreasing, the speed command value generation unit 104 may not cause the speed limit command Vlim to be larger than the changed speed limit command Vlim (in the example illustrated in FIG. 8, Vlim2). This suppresses reacceleration of the battery-type forklift 1 after the battery-type forklift 1 once decelerates. Next, an example of moving on to the switch-back control during the above-described slope control will be described.

Figure 26:
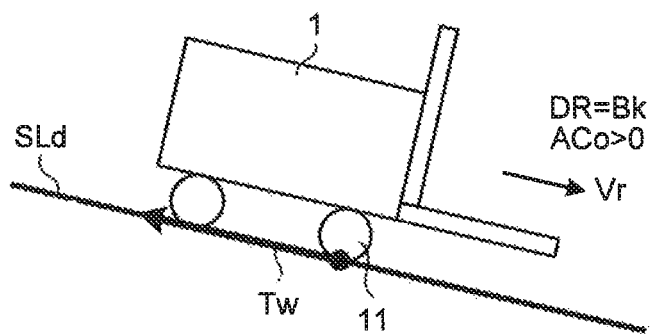
FIG. 26 is a diagram illustrating a state in which the battery-type forklift opens an accelerator and reverses on a downward slope.
Figure 27:
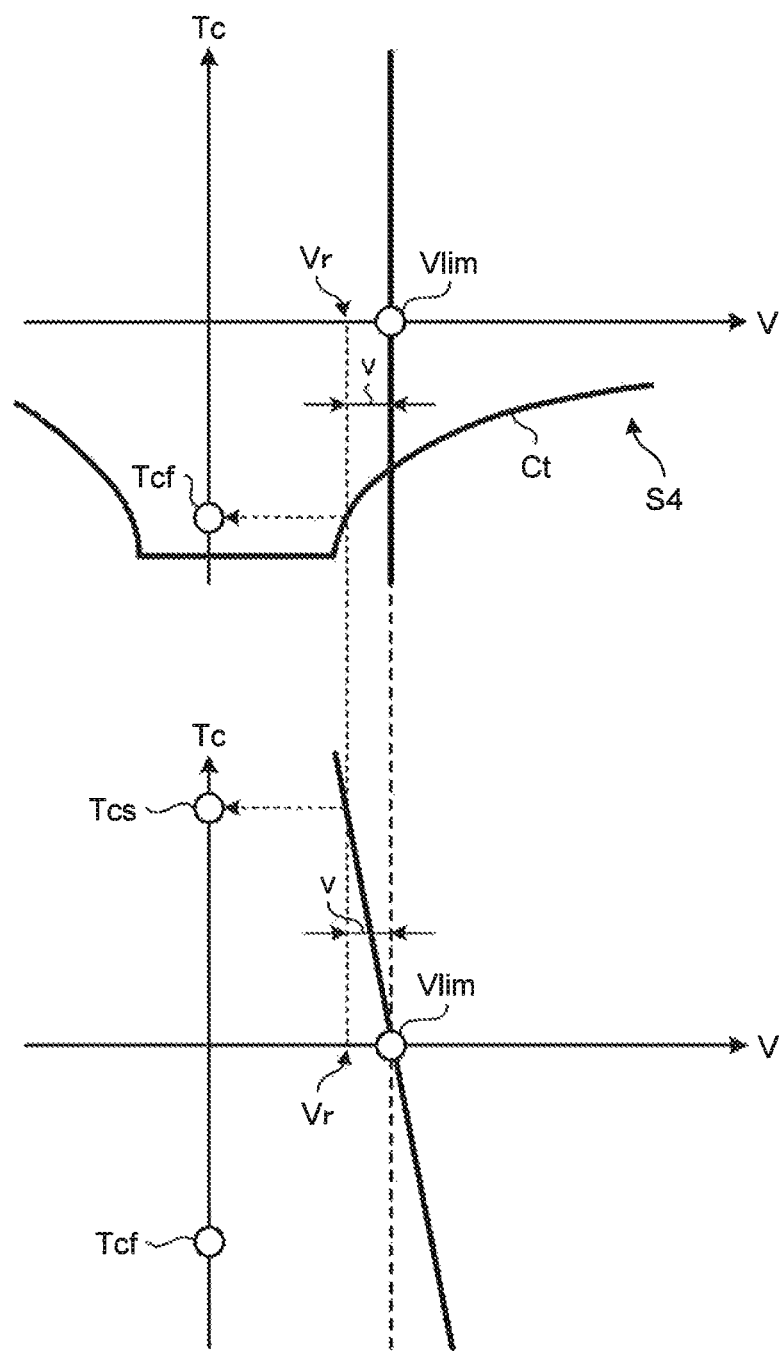
FIG. 27 is a diagram for describing a torque command value in a state in which the battery-type forklift opens an accelerator and reverses on a downward slope.

FIG. 26 is a diagram illustrating a state in which the battery-type forklift opens the accelerator and reverses on a downward slope. FIG. 27 is a diagram for describing a torque command value in a state where the battery-type forklift opens the accelerator and reverses on a downward slope. A case will be considered, in which the slope control as illustrated in FIG. 14 is being executed when the battery-type forklift 1 is on the downward slope SLd where the direction of travel switching lever 39 is switched to the advance position as described in FIG. 13. In this state, the battery-type forklift 1 is gradually advancing and going down the downward slope SLd. At this time, assume that the operator switches the direction of travel switching lever 39 to the reverse position, that is, switches the lever opposite to the current direction of travel, and opens the accelerator pedal 37. Then, as illustrated in FIG. 26, the battery-type forklift 1 is advancing at the actual traveling speed Vr, but the direction of travel command value DR is switched from Fw to Bk. In this case, the actual direction of travel of the battery-type forklift 1 and the direction of travel command value DR are different by switching of the direction of travel command value DR. Therefore, the switch-back control is executed.

Since a difference in the direction of travel occurs in the battery-type forklift 1, the first control unit 101 and the second control unit 102 execute the switch-back control. In executing the switch-back control, the first torque command value generation unit 103 of the first control unit 101 generates the first torque command value Tcf using the torque command curve Ct in the fourth quadrant S4 based on the brake force curve. The speed command value generation unit 104 of the first control unit 101 causes a value, which is obtained by adding the speed V to the actual traveling speed Vr at the timing when the difference in the direction of travel occurs in the battery-type forklift 1, to be the speed limit command Vlim, as illustrated in FIG. 27. The second control unit 102 generates the second torque command value Tcs from the speed limit command Vlim and the actual traveling speed Vr. Since the battery-type forklift 1 is advancing, the second control unit 102 causes a smaller one of the first torque command value Tcf and the second torque command value Tcs, in this example, the first torque command value Tcf to be the third torque command value Tci. The inverter 54 illustrated in FIG. 4 controls the traveling motor 50 to generate the first torque command value Tcf.

The switch-back control according to the present embodiment causes a value, which is obtained by adding the speed v to the actual traveling speed Vr at the timing when the difference in the direction of travel occurs in the battery-type forklift 1, to be the speed limit command Vlim. In doing so, as illustrated in FIG. 27, the first torque command value Tcf based on the brake force curve and the like becomes the third torque command value Tci. Therefore, the traveling motor 50 can give the operator a feeling of acceleration in accordance with the operation of the accelerator pedal 37.

Figure 28:
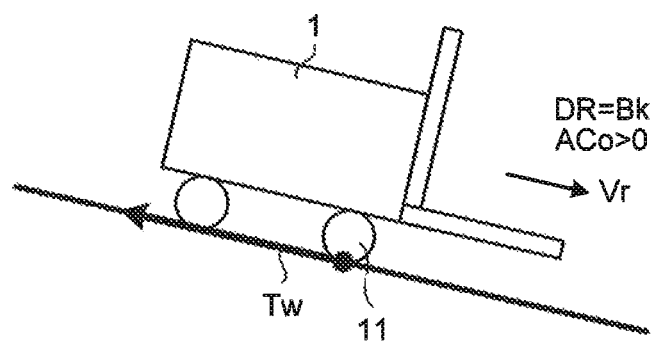
FIG. 28 is a diagram illustrating a state in which the switch-back control is being executed when the battery-type forklift is on a downward slope.
Figure 29:
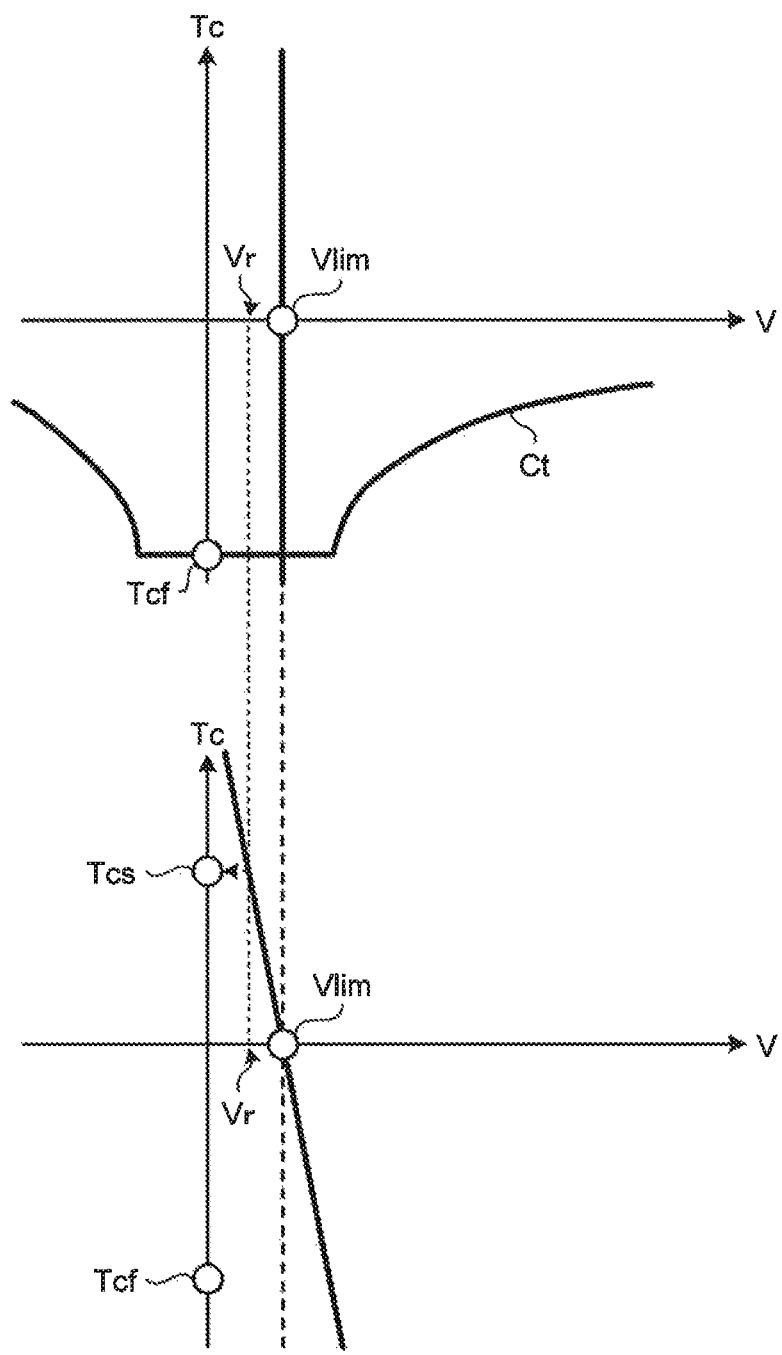
FIG. 29 is a diagram for describing a torque command value in the switch-back control when the battery-type forklift is on a downward slope.

FIG. 28 is a diagram illustrating a state in which the switch-back control is being executed when the battery-type forklift is on a downward slope. FIG. 29 is a diagram for describing a torque command value in the switch-back control when the battery-type forklift is on a downward slope. When the control is switched from the slope control to the switch-back control, the actual traveling speed Vr at which the battery-type forklift 1 advances is gradually decreased. When the actual traveling speed Vr becomes smaller, the speed command value generation unit 104 of the first control unit 101 causes the speed limit command Vlim to be smaller than a previous value, as described above. Since the actual traveling speed Vr is positive, that is, the battery-type forklift 1 is advancing, the second control unit 102 causes a smaller one of the first torque command value Tcf and the second torque command value Tcs, in this example, the first torque command value Tcf to be the third torque command value Tci. The inverter 54 illustrated in FIG. 4 controls the traveling motor 50 to generate the first torque command value Tcf. When the actual traveling speed Vr of the battery-type forklift 1 becomes 0 and the direction of travel is inverted, the direction of travel command value DR is switched from Bk to Fw. Then, the actual direction of travel of the battery-type forklift 1 and the direction of travel command value DR become the same, and thus the first control unit 101 and the second control unit 102 control the traveling motor 50 by the powering control.

In the present embodiment, the first control unit 101 determines the speed limit command Vlim based on the accelerator opening ACo, the actual traveling speed Vr, and the actual direction of travel of the battery-type forklift 1. For example, the switch-back control according to the present embodiment causes a speed having a larger absolute value than the actual traveling speed Vr at the timing when the direction of travel command value DR and the actual direction of travel of the battery-type forklift 1 (the direction of the actual traveling speed Vr) become different or the actual traveling speed Vr to be the speed limit command Vlim, whereby the control can be promptly moved from the slope control to the switch-back control. In addition, a sudden change of the acceleration at the movement of the control can be suppressed.

In the present embodiment, the above-described slope control and switch-back control are executed on condition that the actual direction of travel of the battery-type forklift 1 and the direction of travel defined by the direction of travel command value DR are different. Then, the slope control is executed when the above-described difference occurs by changing of the actual direction of travel of the battery-type forklift 1, and the switch-back control is executed when the above-described difference occurs by changing of the direction of travel command value DR. By employing such a logic of the control, the present embodiment can clearly switch the switch-back control and the slope control, and can realize both of the controls. In addition, during the execution of the switch-back control according to the present embodiment, the speed limit command Vlim is caused to follow the actual traveling speed Vr only when the absolute value of the actual traveling speed Vr becomes smaller, so that an increase in speed of the battery-type forklift 1 is suppressed even if the vehicle enters a slope during the switch-back control, and both of the switch-back control and the slope control can be realized. As a result, when the battery-type forklift 1 loads an object to be transported that may easily fall down due to low density such as expanded polystyrene, instability of the package can be suppressed.

<Powering Control>

In the powering control, the speed command value generation unit 104 of the first control unit 101 illustrated in FIG. 4 changes the speed limit command Vlim according to passage of time. In doing so, when the battery-type forklift 1 starts, a sharp change of the actual traveling speed Vr can be suppressed. After a certain time has passed after the battery-type forklift 1 starts, the battery-type forklift 1 is controlled according to the first torque command value Tcf generated by the first torque command value generation unit 103, that is, according to the first torque command value Tcf determined based on the traction force curve or the brake force curve.

Figure 30:
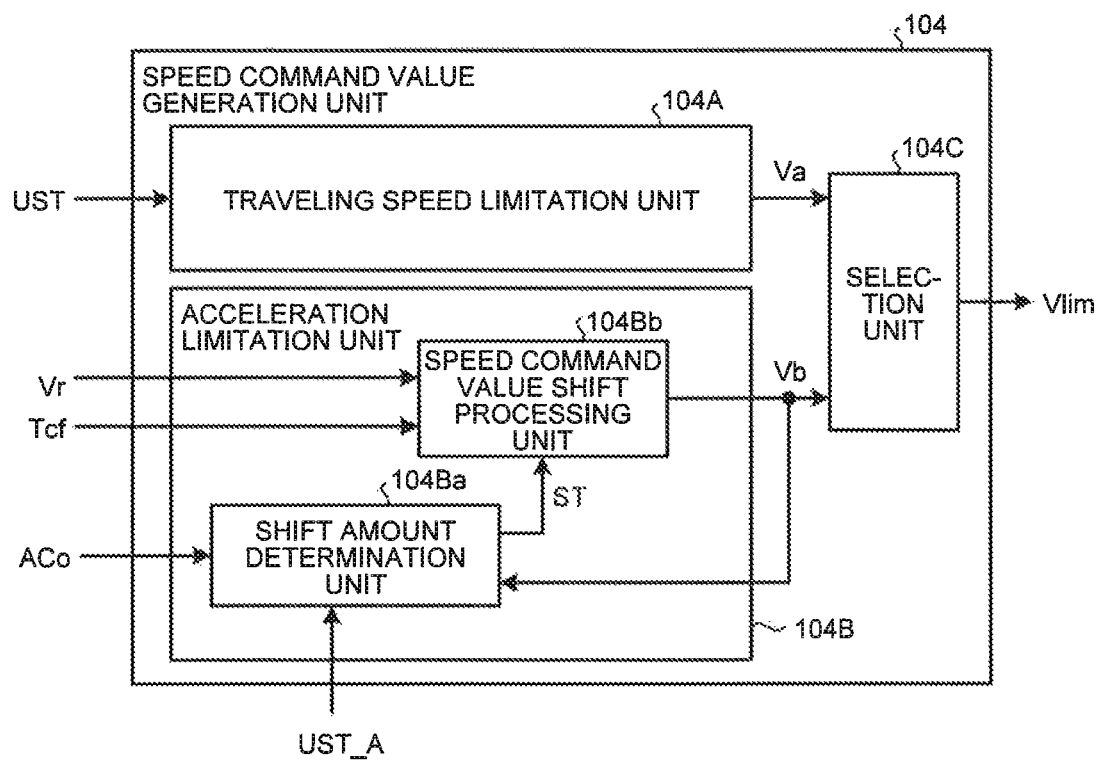
FIG. 30 is a control block diagram of a speed command value generation unit included in the first control unit.

FIG. 30 is a control block diagram of a speed command value generation unit included in the first control unit. The speed command value generation unit 104 includes a traveling speed limitation unit 104A, an acceleration limitation unit 104B, and a selection processing unit 104C. The traveling speed limitation unit 104A has a function to limit an upper limit of the actual traveling speed Vr of the battery-type forklift 1. The traveling speed limitation unit 104A includes a speed limitation setting value UST_B for limiting the actual traveling speed V of the battery-type forklift 1, for example, and outputs the value as a first speed limit command Va. A setting value UST is input to the traveling speed limitation unit 104A. By an input of the setting value UST, the content of the traveling speed limitation unit 104A, for example, a value of the speed limitation setting value UST_B is rewritten. As a result, the traveling speed limitation unit 104A can output the first speed limit command Va having a different value.

The acceleration limitation unit 104B includes a shift amount determination unit 104Ba and a speed command value shift processing unit 104Bb. Accelerator opening ACo is input to the shift amount determination unit 104Ba. The shift amount determination unit 104Ba determines an amount of change of the speed limit command Vlim according to the passage of time, that is, a shift amount ST, based on the input accelerator opening ACo. The speed limit command Vlim generated and output by the speed command value generation unit 104 becomes equal to the second speed limit command Vb generated and output by the speed command value shift processing unit 104Bb of the acceleration limitation unit 104B when there is no restriction by the traveling speed limitation unit 104A. A setting value UST_A is input to the shift amount determination unit 104Ba. A characteristic of change of the speed limit command Vlim according to the passage of time is changed according to the setting value UST_A.

The actual traveling speed Vr, the first torque command value Tcf generated by the first torque command value generation unit 103 of the first control unit 101, and the shift amount ST determined by the shift amount determination unit 104Ba are input to the speed command value shift processing unit 104Bb. The actual traveling speed Vr corresponds to the motor engine speed N of the traveling motor 50. The speed command value shift processing unit 104Bb generates and outputs the second speed limit command Vb based on the actual traveling speed Vr, the first torque command value Tcf, and the shift amount ST. In the present embodiment, an initial value of the second speed limit command Vb is β or −β illustrated in FIG. 8. If the direction is positive (advance) when the actual traveling speed Vr is input, the initial value of the second speed limit command Vb becomes β, and if the direction is negative (reverse), the initial value of the second speed limit command Vb becomes −β.

The first speed limit command Va and the second speed limit command Vb are input to the selection processing unit 104C. When the actual traveling speed Vr is positive, that is the battery-type forklift 1 is advancing, the selection processing unit 104C selects a smaller one of the first speed limit command Va and the second speed limit command Vb and outputs the one as the speed limit command Vlim. When the actual traveling speed Vr is negative, that is, the battery-type forklift 1 is reversing, the selection processing unit 104C selects a larger one of the first speed limit command Va and the second speed limit command Vb and outputs the one as the speed limit command Vlim. The selection processing unit 104C selects a smaller absolute value of the first speed limit command Va and the second speed limit command Vb.

Figure 31:
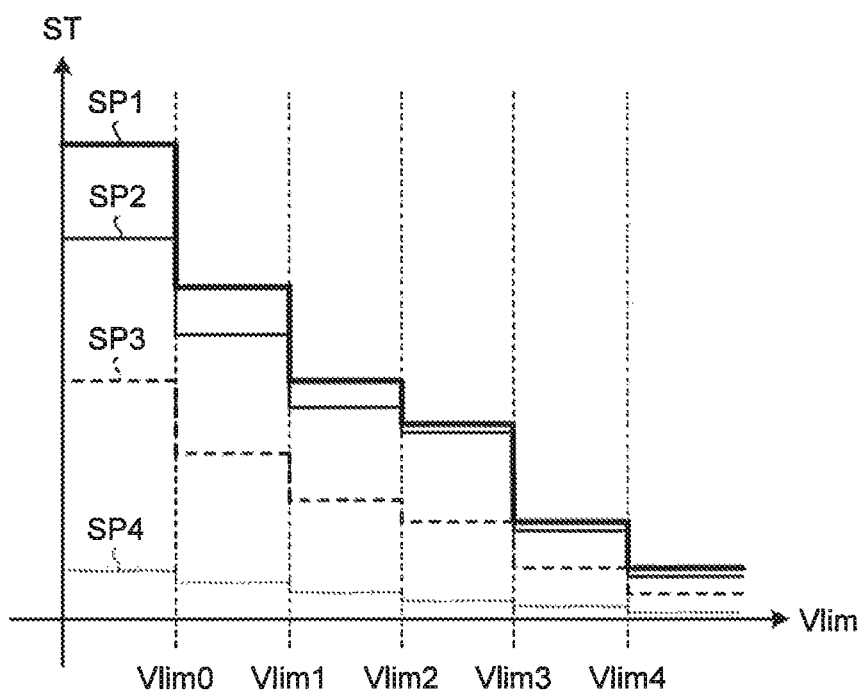
FIG. 31 is a diagram for describing a shift amount of a speed limit command determined by a shift amount determination unit.
Figure 32:
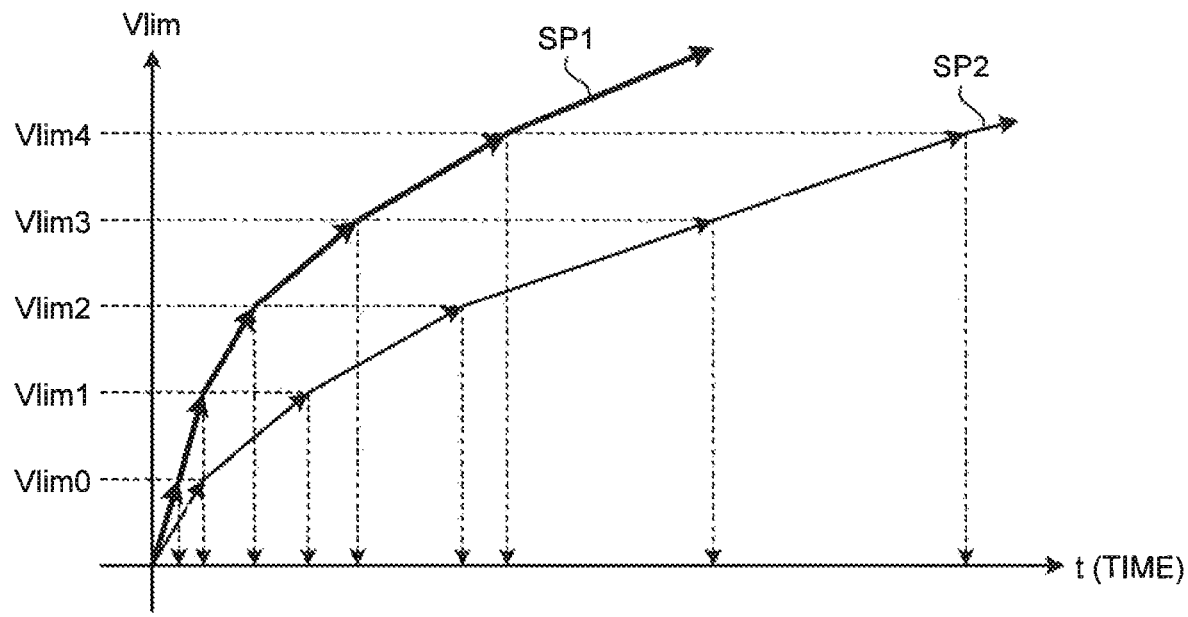
FIG. 32 is a diagram illustrating an example when a speed limit command is changed based on a shift amount.

FIG. 31 is a diagram for describing a shift amount of a speed limit command determined by the shift amount determination unit. FIG. 32 is a diagram illustrating an example of a case in which the speed limit command is changed based on the shift amount. The shift amount ST of the speed limit command Vlim is an amount of change of the speed limit command Vlim during a predetermined time, and the unit is km/h/msec, for example. That is, the shift amount ST represents the magnitude of the speed limit command Vlim changed per 1 msec.

As illustrated in FIG. 31, in the present embodiment, the shift amount ST differs depending on the magnitude of the speed limit command Vlim. In the present embodiment, the larger the speed limit command Vlim, the smaller the shift amount ST. The shift amount ST is not limited to the above example, and may become larger as the speed limit command Vlim becomes larger, or may be changed to have a maximum value or a minimum value when the speed limit command Vlim is a certain value. The speed command value generation unit 104 can change the speed limit command Vlim according to passage of time by changing the speed limit command Vlim in every control cycle based on the shift amount ST. As a result, the first control unit 101 and the second control unit 102 can define the limitation of acceleration when the battery-type forklift 1 travels.

Further, in FIG. 31, four types of shift characteristics: SP1, SP2, SP3, and SP4 are described. The shift amounts ST in the same speed limit command Vlim become smaller in the order of the shift characteristics: SP1, SP2, SP3, and SP4. The shift characteristics: SP1, SP2, SP3, and SP4 are selected according to the accelerator opening ACo. In the present embodiment, as the accelerator opening ACo becomes larger, the shift characteristics are changed in the order of SP4, SP3, SP2, and SP1. The actual acceleration of the battery-type forklift 1 can be prevented from exceeding the defined acceleration by changing of the shift amounts ST based on the speed limit command Vlim when the actual traveling speed Vr exceeds the speed limit command Vlim due to disturbance or the like.

When the speed command value generation unit 104 changes the speed limit command Vlim based on the shift characteristics SP1, SP2, or the like, the speed limit command Vlim is changed with respect to a time t as illustrated in FIG. 32, for example. In the present embodiment, the absolute value of the speed limit command Vlim becomes larger according to passage of the time t. SP1 and SP2 illustrated by the solid lines of FIG. 32 are results of changing of the speed limit command Vlim based on the shift characteristics SP1 and SP2, respectively. The SP1 and SP2 illustrated by the solid lines indicate shortest times required for the battery-type forklift 1 to reach the actual traveling speed Vr (corresponding to the speed limit command Vlim).

In the present embodiment, the speed command value generation unit 104 determines whether the speed limit command Vlim is changed into a direction of increasing in speed or into a direction of deceleration, according to a control state of the second control unit 102. The control state of the second control unit 102 is a state of control for generating the third torque command value Tci. To be specific, the control state is a state of processing by the second control unit 102, in which whether the third torque command value Tci is generated according to either the first torque command value Tcf based on the traction force curve and the like, or the second torque command value Tcs based on the speed limit command Vlim is determined.

Figure 33:
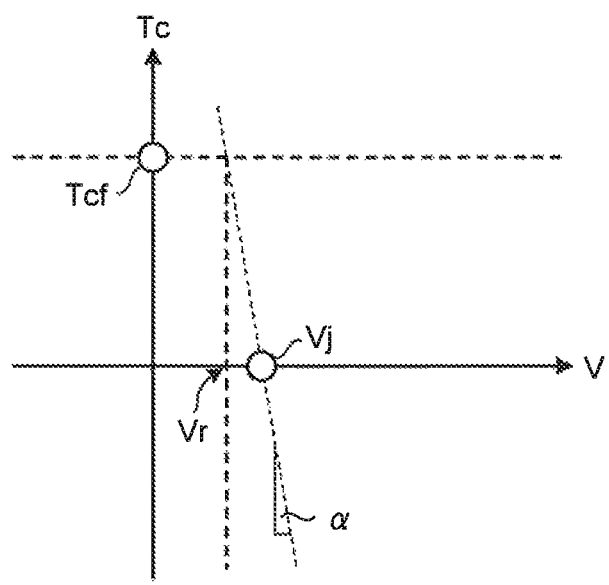
FIG. 33 is a diagram for describing an example of a technique of determining, by the speed command value generation unit of the first control unit, a control state of the second control unit.
Figure 34:
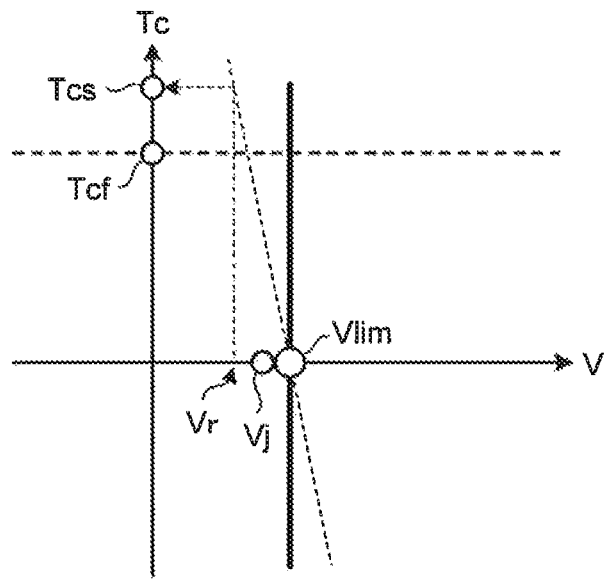
FIG. 34 is a diagram for describing an example of a technique of determining, by the speed command value generation unit of the first control unit, a control state of the second control unit.
Figure 35:
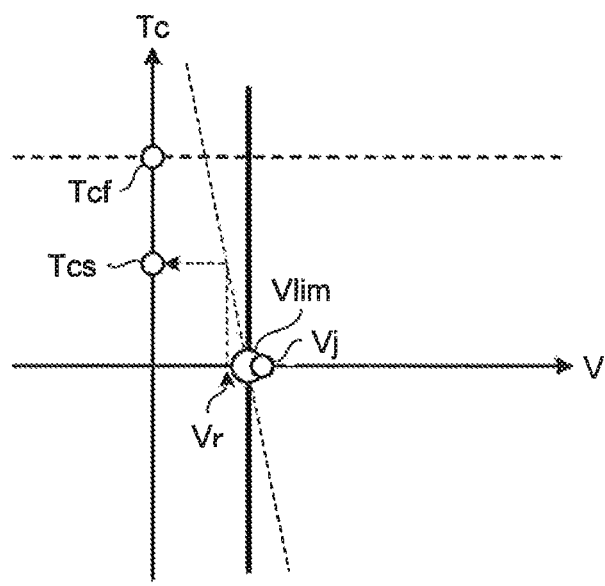
FIG. 35 is a diagram for describing an example of a technique of determining, by the speed command value generation unit of the first control unit, a control state of the second control unit.
Figure 36:
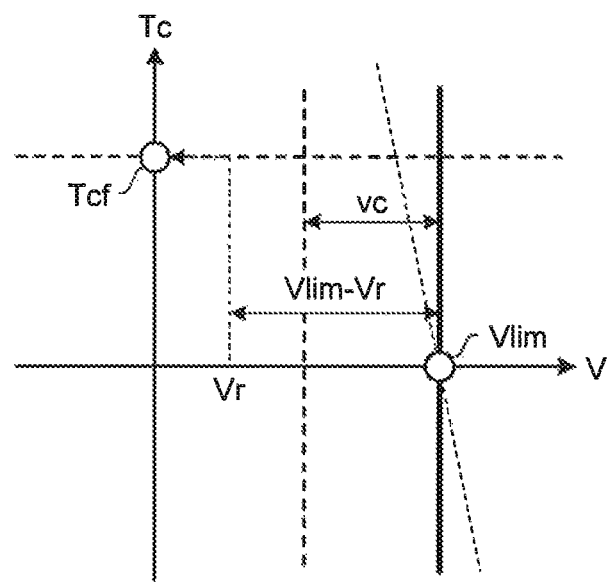
FIG. 36 is a diagram illustrating a change example of a speed limit command when the second control unit is controlling a traveling motor according to a first torque command value.

FIGS. 33 to 35 are diagrams for describing an example of a technique of determining, by the speed command value generation unit of the first control unit, the control state of the second control unit. FIG. 36 is a diagram illustrating an example of a change of a speed limit command when the second control unit is controlling the traveling motor according to the first torque command value. The speed command value generation unit 104 of the first control unit 101, to be specific, the speed command value shift processing unit 104Bb obtains a determination speed Vj based on the first torque command value Tcf and the actual traveling speed Vr. The determination speed Vj can be expressed by a formula (1) using the coefficient α, the first torque command value Tcf, and the actual traveling speed Vr from FIG. 33. The coeffi cient α is one used when the second torque command value Tcs is generated based on the speed limit command Vlim.

$$Vj = Tcf/\alpha + Vr \qquad (1)$$

After obtaining the determination speed Vj, the speed command value shift processing unit 104Bb compares the determination speed Vj and the speed limit command Vlim in the current control cycle. As illustrated in FIG. 34, when the determination speed Vj<the speed limit command Vlim, the speed command value shift processing unit 104Bb determines that the second control unit 102 is controlling the traveling motor 50 using the first torque command value Tcf generated by the first control unit 101 as the third torque command value Tci. When the determination speed Vj>the speed limit command Vlim as illustrated in FIG. 35, the speed command value shift processing unit 104Bb determines that the second control unit 102 is controlling the traveling motor 50 using the second torque command value Tcs generated based on the speed limit command Vlim as the third torque command value Tci. Note that the speed command value shift processing unit 104Bb may directly obtain the control state of the second control unit 102 through the communication line 110 illustrated in FIG. 3.

As a result of the determination, when the second control unit 102 is controlling the traveling motor 50 according to the second torque command value Tcs, the speed command value shift processing unit 104Bb changes the second speed limit command Vb (speed limit command Vlim) into a direction in which the absolute value is increased by the shift amount ST determined by the shift amount determination unit 104Ba. In doing so, the first control unit 101 and the second control unit 102 can accelerate the battery-type forklift 1 by the acceleration defined by the shift characteristics SP1 and SP2 of the shift amount ST and the like.

As a result of the determination, when the second control unit 102 is controlling the traveling motor 50 according to the first torque command value Tcf, when the difference between the speed limit command Vlim and the current actual traveling speed Vr (Vlim−Vr) becomes larger, the operator of the battery-type forklift 1 recognizes that expected acceleration cannot be obtained and may increase the stepping on of the accelerator pedal 37. As a result, rapid acceleration of the battery-type forklift 1 may be caused. When the traveling resistance of the battery-type forklift 1 is large, sufficient acceleration cannot be obtained and (Vlim−Vr) may become large.

In such a case, the speed command value shift processing unit 104Bb performs control as follows. As illustrated in FIG. 36, when the difference (Vlim−Vr) between the speed limit command Vlim and the current actual traveling speed Vr becomes a predetermined threshold (for example, speed vc) or more, the speed command value shift processing unit 104Bb makes the absolute value of the speed limit command Vlim small. This enables the difference between the speed limit command Vlim and the current actual traveling speed Vr to become smaller.

When the battery-type forklift 1 is advancing, the traveling motor 50 is controlled based on a smaller one of the first torque command value Tcf and the second torque command value Tcs. When the difference between the speed limit command Vlim and the current actual traveling speed Vr becomes smaller, the second torque command value Tcs based on the speed limit command Vlim and the actual traveling speed Vr becomes smaller. Therefore, when the operator increases the stepping on of the accelerator pedal 37, the first torque command value Tcf based on the traction force curve and the like is sharply increased, but the increase in second torque command value Tcs based on the speed limit command Vlim is suppressed. Therefore, the latter value is more likely to be selected. As a result, the powering control by the second torque command value Tcs based on the speed limit command Vlim is executed and the second torque command value Tcs is not rapidly increased. Therefore, the rapid acceleration of the battery-type forklift 1 can be suppressed.

Figure 37:
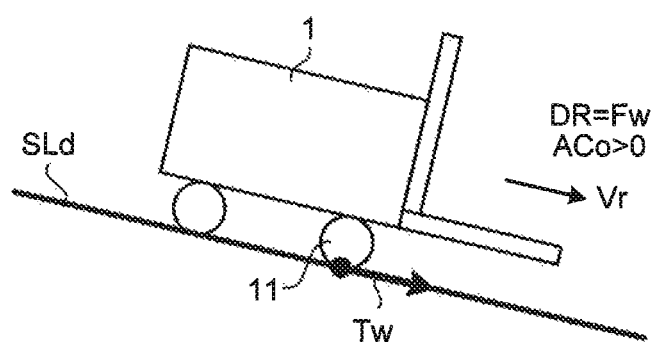
FIG. 37 is a diagram illustrating a state in which the battery-type forklift has opened an accelerator pedal on a downward slope.
Figure 38:
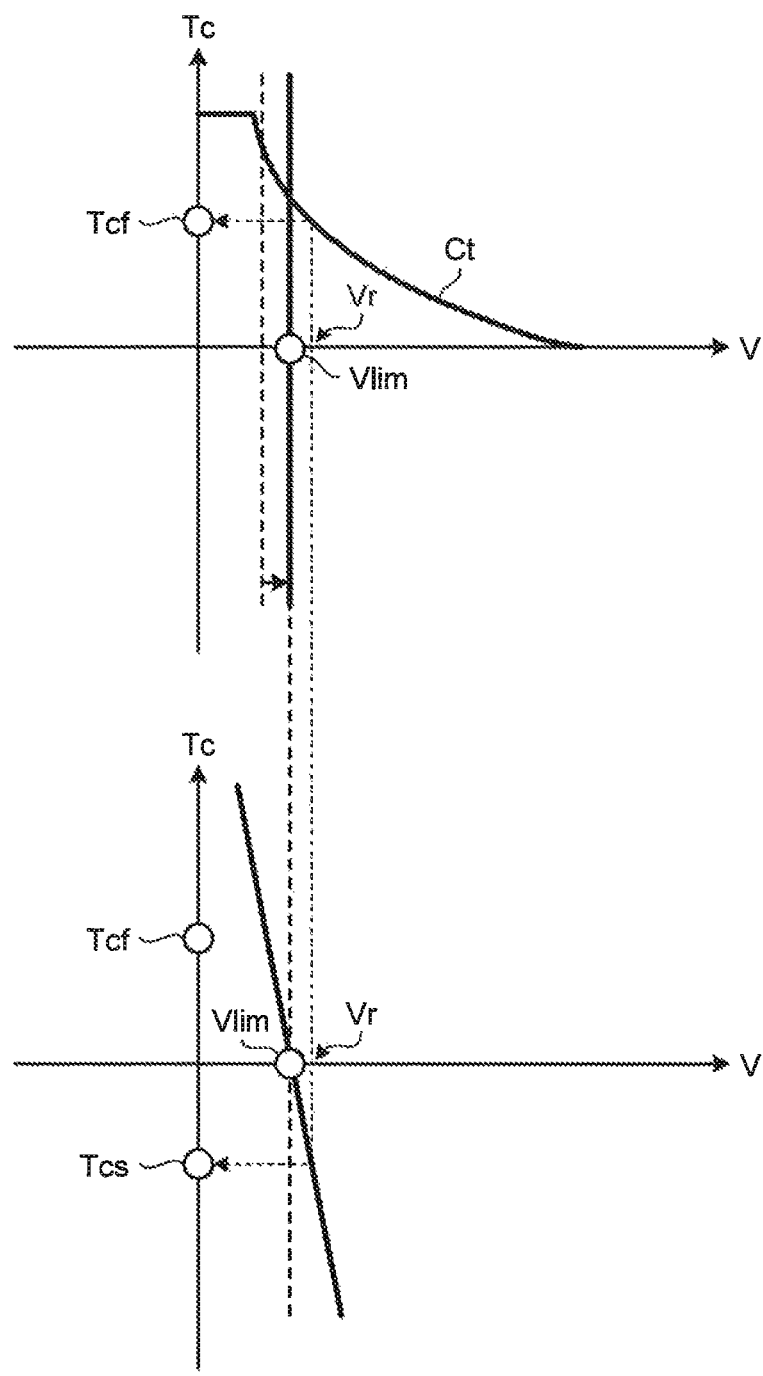
FIG. 38 is a diagram for describing a torque command value when the battery-type forklift has opened the accelerator pedal on a downward slope.

FIG. 37 is a diagram illustrating a state in which the battery-type forklift has opened the acceleration pedal on a downward slope. FIG. 38 is a diagram for describing a torque command value when the battery-type forklift has opened the acceleration pedal on a downward slope. During execution of the above-described slope control (see FIGS. 13 and 14), the traveling motor 50 is controlled by the powering control by stepping on of the accelerator pedal 37 and opening of the accelerator (ACo>0).

When the actual traveling speed Vr is larger than the speed limit command Vlim as illustrated in FIG. 37 in executing the powering control according to the present embodiment, the first control unit 101 and the second control unit 102 control the traveling motor 50 based on the speed limit command Vlim and cause the absolute value of the speed limit command Vlim to become larger as the passage of time. This causes the traveling motor 50 and the front wheel 11 to generate positive torque Tw, which has generated negative torque in the slope control (torque in the direction in which the vehicle reverses on the downward slope SLd) in order to allow the battery-type forklift 1 to advance on the downward slope SLd. At this time, the absolute value of the speed limit command Vlim is caused to become larger as the passage of time. Therefore, rapid inversion of the torque generated by the traveling motor 50 and the front wheel 11 can be suppressed. As a result, the powering control according to the present embodiment can suppress rapid acceleration of the battery-type forklift 1 when the battery-type forklift 1 performs powering and advances on the downward slope SLd.

The powering control according to the present embodiment changes the speed limit command Vlim according to the passage of time, to be specific, causes the absolute value to become larger as the passage of time when the accelerator opening ACo is larger than 0. In doing so, the torque of the traveling motor 50 can be controlled by the second torque command value Tcs based on the speed limit command Vlim right after the start of the battery-type forklift 1, whereby a rapid increase in torque can be suppressed. As a result, when the battery-type forklift 1 loads an object to be transported that may easily fall down due to low density such as expanded polystyrene, instability of the package can be suppressed. In addition, since the speed limit command Vlim is increased as the passage of time, when a certain time has passed after the start of the battery-type forklift 1, the torque of the traveling motor 50 can be suppressed by the first torque command value Tcf based on the traction force curve and the like. As a result, a response to the operation of the accelerator pedal 37 is improved, and thus drivability is improved.

When the second control unit 102 generates the second torque command value Tcs based on the speed limit command Vlim, if the coefficient α is made larger, the second torque command value Tcs rapidly rises even if the change of the actual traveling speed Vr is small. Therefore, the responsibility is improved and the set traveling speed can be easily realized. Further, in the present embodiment, the first control unit 101 and the second control unit 102 are connected in the communication line 110, and the second torque command value Tcs is generated in the second control unit 102. When the first control unit 101 generates the first torque command Tcf based on the speed limit command Vlim, a communication delay is generated until when the traveling motor 50 is output based on a command from the first control unit 101. In this case, if the coefficient α is made larger, a gap may be caused between a torque output generated from the traveling motor 50 based on the command of the first control unit 101 and intended torque to be actually output when the change of the actual traveling speed Vr is large, and the hunting may be caused. Therefore, it is necessary to make the coefficient α of the first torque command Tcf from the first control unit 101 small in order to suppress the hunting due to the communication delay. In contrast, in the present embodiment, the second torque command value Tcs is generated in the second control unit 102, and therefore, it is not necessary to consider the above-described communication delay. As a result, the coefficient α can be made larger.

The present embodiment has been described. However, the present embodiment is not limited by the above-described content. Further, the above-described configuration elements include things that can be easily conceived by a person skilled in the art, substantially the same, and so-called equivalents. Further, the above-described configuration elements can be appropriately combined. Further, various types of omission, replacement, and changes of the configuration elements can be performed without departing from the gist of the present embodiment.

REFERENCE SIGNS LIST

1 BATTERY-TYPE FORKLIFT
2 CONTROL SYSTEM
10 VEHICLE BODY
11 FRONT WHEEL
12 REAR WHEEL
13 FORK
30 BATTERY
50 TRAVELING MOTOR
50R ENGINE SPEED DETECTION SENSOR
51 POWER TRANSMISSION DEVICE
52 OPERATION PANEL
53 DC/DC CONVERTER
54 INVERTER
101 FIRST CONTROL UNIT
102 SECOND CONTROL UNIT
103 FIRST TORQUE COMMAND VALUE GENERATION UNIT
104 SPEED COMMAND VALUE GENERATION UNIT
104A TRAVELING SPEED LIMITATION UNIT
104B ACCELERATION LIMITATION UNIT
104Ba SHIFT AMOUNT DETERMINATION UNIT
104Bb SPEED COMMAND VALUE SHIFT PROCESSING UNIT
104C SELECTION PROCESSING UNIT
105 SECOND TORQUE COMMAND VALUE GENERATION UNIT
106 TORQUE COMMAND VALUE GENERATION UNIT
107 SUBTRACTION UNIT
108 MULTIPLICATION UNIT
110 COMMUNICATION UNIT
ACo ACCELERATOR OPENING
Ct, Ct1, and Ct2 TORQUE COMMAND CURVE
DR DIRECTION OF TRAVEL COMMAND VALUE
Im DRIVING CURRENT
N MOTOR ENGINE SPEED
ST SHIFT AMOUNT
Tc TORQUE COMMAND VALUE
Vlim SPEED LIMIT COMMAND
Va FIRST SPEED LIMIT COMMAND
Vb SECOND SPEED LIMIT COMMAND
Vr, Vr1, Vr2, Vr3, and Vr4 ACTUAL TRAVELING SPEED
α COEFFICIENT

The invention claimed is:

1. A work vehicle at least provided with a traveling motor, comprising:
a first control unit configured to generate a speed command value for controlling the motor and to change the speed command value according to passage of time when an opening of an accelerator that adjusts a traveling speed is larger than 0, and further to generate a first torque command value by assigning an actual traveling speed of the work vehicle to a relationship between a torque command value that is a command value of torque to be generated by the motor and the traveling speed of the work vehicle; and
a second control unit configured to generate a second torque command value based on the speed command value generated by the first control unit and the actual traveling speed, and to control the motor based on either the first torque command value or the second torque command value; wherein the first control unit is configured to obtains a speed from the first torque command value and the actual traveling speed, and to determine that the second control unit controls the motor based on the first torque command value when the speed is the speed command value or less, and the second control unit controls the motor based on the second torque command value when the speed is larger than the speed command value.

2. The work vehicle according to claim 1, wherein the first control unit is configured to cause an absolute value of the speed command value to be larger according to passage of time when the second control unit controls the motor using the second torque command value.

3. The work vehicle according to claim 2, wherein the first control unit is configured to change a change of the speed command value with respect to passage of time based on the opening of the accelerator.

4. The work vehicle according to claim 1, wherein when the second control unit controls the motor using the first torque command value, the first control unit is configured to cause an absolute value of the speed command value to be smaller when a difference between the speed command value and the actual traveling speed becomes a predetermined threshold or more.

5. The work vehicle according to claim 1, wherein the first control unit and the second control unit are configured to exchange information through communication.

6. A work vehicle at least provided with a traveling motor, comprising:
a first control unit configured to generate a speed command value for controlling the motor and to causes an absolute value of the speed command value to be larger according to passage of time when an opening of an accelerator that adjusts a traveling speed is larger than 0, and further to assign an actual traveling speed of the work vehicle to a first relationship between a torque command value that is a command value of torque to be generated by the motor and the traveling speed of the work vehicle to generate a first torque command value; and
a second control unit configured to exchange information with the first control unit through communication and to assign the actual traveling speed to a second relationship between the torque command value and the traveling speed based on the speed command value generated by the first control unit to generate a second torque command value, and to control the motor based on either the first torque command value or the second torque command value; wherein the first control unit is configured to obtains a speed from the first torque command value and the actual traveling speed, and to determine that the second control unit controls the motor based on the first torque command value when the speed is the speed command value or less, and the second control unit controls the motor based on the second torque command value when the speed is larger than the speed command value.

* * * * *